United States Patent
Gohshi et al.

(10) Patent No.: US 8,687,124 B2
(45) Date of Patent: Apr. 1, 2014

(54) SIGNAL PROCESSING DEVICE, INTEGRATED CIRCUIT, CONTROL PROGRAM, AND COMPUTER READABLE RECORDING MEDIUM

(75) Inventors: Seiichi Gohshi, Osaka (JP); Takaji Numao, Osaka (JP); Takashi Mine, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/576,408

(22) PCT Filed: Nov. 8, 2010

(86) PCT No.: PCT/JP2010/069843
§ 371 (c)(1),
(2), (4) Date: Aug. 1, 2012

(87) PCT Pub. No.: WO2011/099203
PCT Pub. Date: Aug. 18, 2011

(65) Prior Publication Data
US 2013/0002961 A1  Jan. 3, 2013

(30) Foreign Application Priority Data
Feb. 15, 2010  (JP) ................................. 2010-030574

(51) Int. Cl.
*H04N 5/00* (2011.01)
*H04N 5/21* (2006.01)
*H04N 5/217* (2011.01)
*G06K 9/40* (2006.01)
*G06K 9/48* (2006.01)

(52) U.S. Cl.
USPC ........... 348/607; 348/625; 348/620; 348/241; 382/262; 382/266; 382/199

(58) Field of Classification Search
None
See application file for complete search history.

(56) References Cited

U.S. PATENT DOCUMENTS 5,574,512 A * 11/1996 Saeger .......................... 348/620
(Continued)

FOREIGN PATENT DOCUMENTS

| JP | 07-250264 A | 9/1995 |
| JP | 08-172368 A | 7/1996 |
| JP | 09-163185 A | 6/1997 |
| JP | 10-084498 A | 3/1998 |

(Continued)

OTHER PUBLICATIONS

Official Communication issued in International Patent Application No. PCT/JP2010/069843, mailed on Dec. 21, 2010.

*Primary Examiner* — Jefferey Harold
*Assistant Examiner* — Sean Haiem
(74) *Attorney, Agent, or Firm* — Keating & Bennett, LLP

(57) ABSTRACT

A signal processing device (201) includes noise reduction units (101), cascade-connected to each other, each of which includes: a signal selection section (31) for selecting a representative value from sampled signals obtained from an input signal by sampling a target signal and signals which are away from the target signal by given intervals; a voltage determination section (51) for determining which of a determined representative value and a voltage of the target signal is larger; and a signal output section (61) for increasing or decreasing the voltage of the target signal depending on a result of the determining and outputs the target signal as the output signal. A combination of intervals between the target signal and the signals excluding the target signal vary from noise reduction unit (101) to noise reduction unit (101). A noise reduction unit on a more upstream side has a larger maximum value of the intervals.

9 Claims, 19 Drawing Sheets

(56) References Cited

U.S. PATENT DOCUMENTS

| | | |
|---|---|---|
| 6,195,132 B1 * | 2/2001 | Kimura et al. .................. 348/618 |
| 2004/0246378 A1 * | 12/2004 | Okada et al. .................. 348/625 |
| 2010/0066868 A1 * | 3/2010 | Shohara ........................ 348/241 |

FOREIGN PATENT DOCUMENTS

| | | |
|---|---|---|
| JP | 10-248027 A | 9/1998 |
| JP | 2000-022992 A | 1/2000 |
| JP | 2004-289607 A | 10/2004 |

* cited by examiner

F I G. 1 1
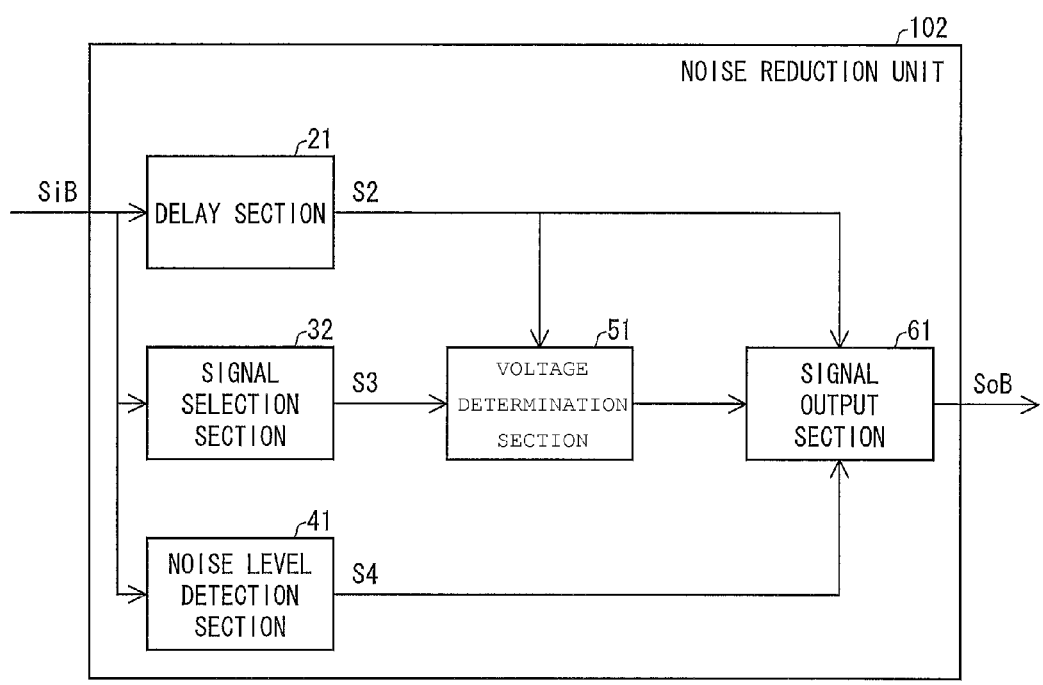

F I G. 1 2
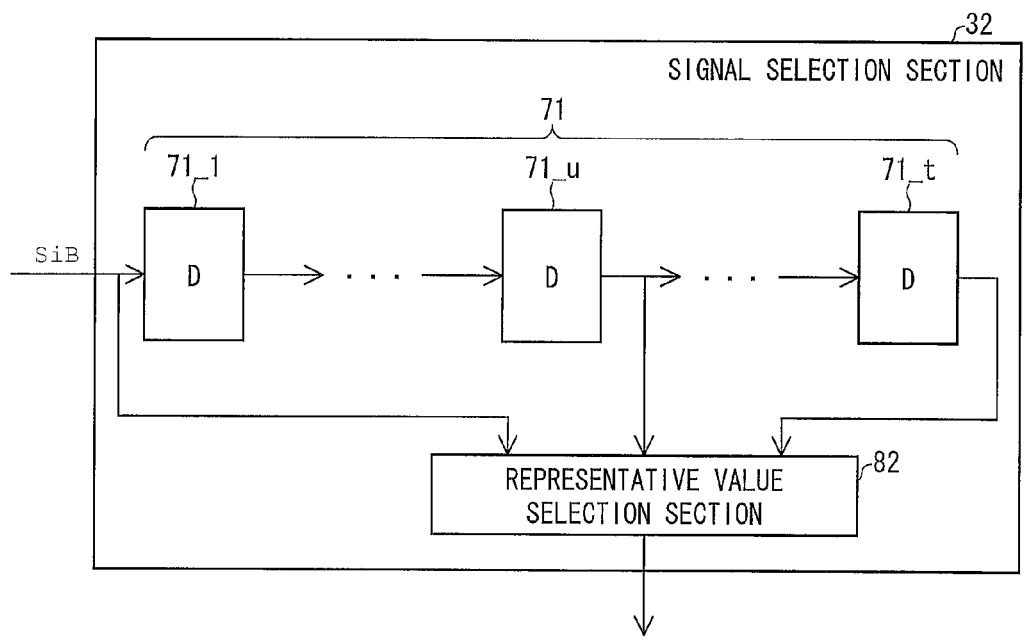

FIG. 13
(a)
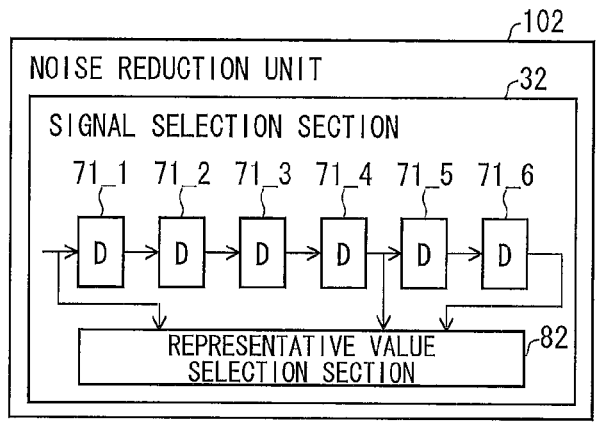
(b)
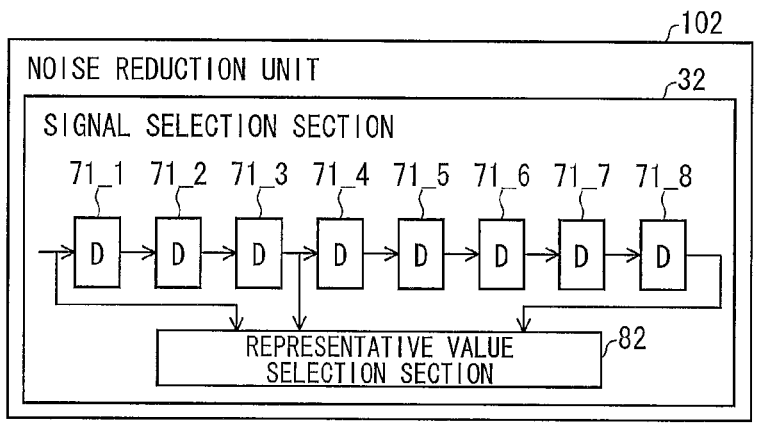
(c)
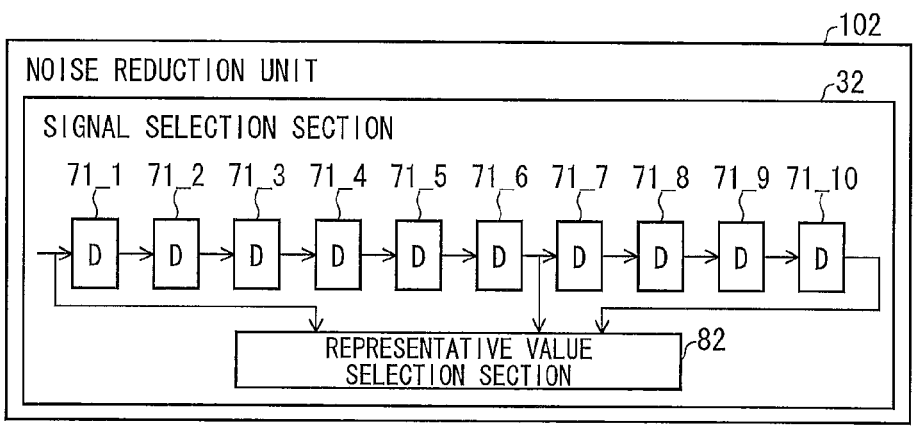

SIGNAL PROCESSING DEVICE, INTEGRATED CIRCUIT, CONTROL PROGRAM, AND COMPUTER READABLE RECORDING MEDIUM

TECHNICAL FIELD

An image signal or an audio signal has a noise while imaging or recording is carried out. The present invention relates to a signal processing device for reducing noise components mixed in a signal.

BACKGROUND ART

Conventionally, while imaging or image data transmitting is being carried out, noise components (noise) such a so-called snow noise, Gaussian noise, or shot noise are mixed in an image signal. For example, in analog TV broadcasting, noise components are mixed in an image signal while the image signal is being transmitted. This is because electric fields used in the analog television broadcasting are generally weak. Similarly, even in a case where an analog video is converted into a digital video and rebroadcast, noise components are mixed in an image signal. Note that this is also true for audio recording or audio data transmitting.

Noise components cause deteriorations in image and sound quality. In order to prevent such deteriorations in image and sound quality, noise reduction circuits (also referred to as noise reducers) for reducing noise components mixed in an image signal and an audio signal have been in widespread use.

For example, a noise reduction circuit as illustrated in FIG. 18, that is, a noise reduction circuit in which a recursive filter using a frame memory is provided, is known to a public as a noise reduction circuit for reducing a noise in a moving image broadcasted on TV or the like. The recursive filter using the frame memory adds a content of a one frame to a content of another frame immediately following the one frame. However, this sometimes causes so-called tailing in a motion part of a moving image.

Also, a median filter, for example, is generally used as a noise reduction circuit. This reduces noise components and thereby prevents the tailing. However, use of the median filter reduces even those signal components of an image signal which are small in amplitude.

Patent Literature 1 discloses a noise reduction circuit that can minimize a distortion in an input signal indicating an image or the like, and reduce noise components mixed in the input signal. To put it briefly, the noise reduction circuit disclosed in Patent Literature 1 decreases the noise components mixed in the received signal, by adding or subtracting a given signal value to or from the input signal depending on a size relationship between a voltage of the input signal indicating the image or the like and a voltage of a signal outputted from a 3-tap type median filter to which the input signal is inputted.

With reference to FIG. 19, the following description will discuss how the noise reduction circuit disclosed in Patent Literature 1 is configured. (a) of FIG. 19 is a block diagram illustrating how the noise reduction circuit is configured. Reference signs in (a) of FIG. 19 are changed from original ones. Otherwise, (a) of FIG. 19 is substantially identical to FIG. 1 of Patent Literature 1.

As illustrated in (a) of FIG. 19, the noise reduction circuit includes a delay circuit 912, a 3-tap median filter 913, a noise level detection circuit 914, a voltage comparison circuit 915, and selection adder and subtracter 916. The noise reduction circuit creates an output signal from an input signal applied across an input terminal $T_{IN}$, and outputs the output signal from an output terminal $T_{OUT}$.

The delay circuit 912 causes a delay so as to make up for a delay time of the received signal caused by the 3-tap median filter 913.

The 3-tap median filter 913 functions as a low-pass filter of a kind, so as to cause a change in waveform of an input signal to be flat. Note, however, that the 3-tap median filter 913 has characteristics in which a rising edge or a falling edge of the input signal is maintained. (b) of FIG. 19 illustrates a detail example configuration of the 3-tap median filter 913. As illustrated in (b) of FIG. 19, the 3-tap median filter 913 is a median filter including a plurality of sample delay circuits 911, which are cascade-connected to each other, and a median selection circuit 931.

The noise level detection circuit 914 detects noise components of a line part which has no image signal during a vertical blanking period of an input video signal, and outputs levels of the noise components in form of a direct voltage.

The voltage comparison circuit 915 determines whether a voltage of an output signal E1 outputted from the delay circuit 912 is larger than that of an output signal E2 outputted from the 3-tap median filter 913 or not.

The selection adder and subtracter 916 create a signal by adding or subtracting an output signal E3 outputted from the noise level detection circuit 914 to or from an output signal E1, depending on a result obtained by the determination made in the voltage comparison circuit 915. Specifically, in a case where the voltage of the output signal E1 is larger than that of the output signal E2, the selection adder and subtracter 918 create a subtracted signal (E1-E3) and supply it to the output terminal TOUT. In contrast, in a case where the voltage of the output signal E1 is smaller than that of the output signal E2, the selection adder and subtracter 918 create an added signal (E1+E3) and supply it to the output terminal $T_{OUT}$. Note that, in a case where the voltage of the output signal E1 is equivalent to that of the output signal E2 (E1=E2), the selection adder and subtracter 918 directly supply the output signal E1 to the output terminal $T_{OUT}$.

According to the configuration, an input signal is subjected to either subtracting or adding so that a given signal is subtracted from a signal in the input signal in a case where the signal has a voltage of larger than a median or a given signal is added to the signal in the input signal in a case where the signal has a voltage of smaller than the median. This makes it possible to cause decreases in amplitude of noise components mixed in the input signal.

CITATION LIST

Patent Literature

Patent Literature 1
Japanese Patent Application Publication, Tokukaihei, No. 7-250264 A (Publication Date: Sep. 26, 1995)

SUMMARY OF INVENTION

Technical Problem

The art disclosed in Patent Literature 1 uniquely determines in which frequency range the noise components are reduced, depending on the number of sample delay circuits 911 (also referred to as the number of taps) included in the 3-tap median filter 913. Therefore, there is a case that noise components in other ranges, where noise components are not decreased in amplitude, remain. However, this gives rise to a problem that the noise components cannot be fully reduced.

Note that it is difficult for humans to view noise components in higher frequency rages, due to human visual characteristics. As such, even in a case where there are noise components in a higher frequency range, it appears as if they were reduced. In contrast, it is easy for humans to view noise components in lower frequency ranges. As such, in a case where there are noise components in a lower frequency range, it appears as if the noise components were not reduced. In the art disclosed in Patent Literature 1, there is a case that the noise components in the lower frequency range remains. As such, it is not possible to fully reduce the noise component.

The present invention is made in view of the problem, and an object of the present invention is to provide a signal processing device that can greatly reduce noise components mixed in a signal.

Solution to Problem

In order to attain the object, a signal processing device of the present invention is a signal processing device that outputs an output signal in which noise components mixed in an input signal have been reduced, and the signal processing device of the present invention includes: a plurality of noise reduction units, cascade-connected to each other, the input signal being supplied to a most upstream side of the plurality of noise reduction units, each of the plurality of noise reduction units including: signal selection means for (i) sampling, from a received signal, (a) a target signal to be subjected to a noise reduction and (b) a plurality of signals which are away from the target signal by given intervals and (ii) selecting a representative value from sampled signals; voltage determination means for determining which of a determined representative value and a voltage of the target signal is larger; and signal output means for (i) reducing the voltage of the target signal by a given voltage and outputting, as the output signal, the target signal thus reduced, in a case where the voltage of the target signal is determined to be larger than the representative value, (ii) increasing the voltage of the target signal by a given value and outputting, as the output signal, the target signal thus increased, in a case where the voltage of the target signal is determined to be smaller than the representative value, or (iii) outputting, as the output signal, the target signal as it is, in a case where the voltage of the target signal is equal to the representative value, a combination of intervals between a target signal and a plurality of signal excluding the target signal to vary from noise reduction unit to noise reduction unit, a noise reduction unit, which is located on the more upstream side of the plurality of noise reduction units, having a larger maximum value of the intervals between the target signal and the plurality of signal excluding the target signal.

In order to attain the object, an integrated circuit of the present invention is an integrated circuit that outputs an output signal in which noise components mixed in an input signal have been reduced, and the integrated circuit of the present invention includes: a plurality of noise reduction units, cascade-connected to each other, the input signal being supplied to a most upstream side of the plurality of noise reduction units, each of the plurality of noise reduction units including a signal selection circuit, which (i) samples, from a received signal, (a) a target signal to be subjected to a noise reduction and (b) a plurality of signals which are away from the target signal by given intervals and (ii) selects a representative value from sampled signals; a voltage determination circuit, which determines which of a determined representative value and a voltage of the target signal is larger; and a signal output circuit, which (i) reduces the voltage of the target signal by a given voltage and outputs, as the output signal, the target signal thus reduced, in a case where the voltage of the target signal is determined to be larger than the representative value, (ii) increases the voltage of the target signal by a given value and outputs, as the output signal, the target signal thus increased, in a case where the voltage of the target signal is determined to be smaller than the representative value, or (iii) outputs, as the output signal, the target signal as it is, in a case where the voltage of the target signal is equal to the representative value, a combination of intervals between a target signal and a plurality of signal excluding the target signal to vary from noise reduction unit to noise reduction unit, a noise reduction unit, which is located on the more upstream side of the plurality of noise reduction units, having a larger maximum value of the intervals between the target signal and the plurality of signal excluding the target signal.

According to the configuration, in each of the plurality of noise reduction units cascade-connected to each other, (i) it is determined which of (a) the determined representative value selected from the sampled signals and (b) the voltage of the target signal to be subjected to the noise reduction is larger, (ii) the voltage of the target signal is increased or decreased by the given voltage, depending on a result of determining, and (iii) the target signal thus increased or decreased is outputted. As such, in each of the plurality of noise reduction units, an output signal is smaller in amplitude than an input signal. This reduces the noise components mixed in the input signal.

Note that, because the voltage of the target signal is thus increased or decreased by the given voltage, depending on a result obtained by a comparison of the voltage of the target signal with the determined representative value, a waveform of an output signal outputted from each of the plurality of noise reduction units has a part having a substantially recessed shape. As such, each output signal contains harmonic components which are not contained in each signal inputted to the plurality of noise reduction units. That is, it can be said that, in each of the plurality of noise reduction units, the noise components are partially concentrated in a higher frequency range.

Further, because the combination of the intervals between the target signal and the plurality of signal excluding the target signal varies from noise reduction unit to noise reduction unit. This makes it possible for the plurality of noise reduction units to carry out processes to signals in respective different frequency ranges.

Furthermore, the maximum value of the intervals between the target signal and the plurality of signal excluding the target signal is larger in that one the plurality of noise reduction units which is located on a more upstream side. As such, a noise reduction unit on the more upstream side carries out the process to a signal in a lower frequency range. In contrast, a maximum value of the intervals between the target signal and the plurality of signal excluding the target signal is smaller in that of the plurality of noise reduction units which is located on a more downstream side. As such, the noise reduction unit on the more downstream side carries out the process to a signal in a high frequency range.

As such, each time an input signal is passed through a cascade-connected noise reduction unit, noise components mixed in the input signal are gradually reduced in a lower frequency range and gradually increased in a higher frequency range. This causes noise components mixed in a signal outputted from a most downstream side of the plurality of noise reduction units to be concentrated in a higher frequency range.

However, even in a case where the noise components are thus increased in the higher frequency range, they are difficult to be perceived by humans. This is because human visual characteristics have a characteristic similar to a low-pass filter or a bandpass filter.

The present invention thus including the plurality of noise reduction units brings about an effect to cause noise components mixed in an image to appear as if they were reduced, as compared with a conventional art.

Note that, although the present invention even decreases a level of an image signal, it also reduces noise components mixed in an image, thereby making it possible that the image as a whole is more finely viewed.

Advantageous Effects of Invention

A signal processing device of the present invention is thus a signal processing device that outputs an output signal in which noise components mixed in an input signal have been reduced, and the signal processing device of the present invention includes: a plurality of noise reduction units, cascade-connected to each other, the input signal being supplied to a most upstream side of the plurality of noise reduction units, each of the plurality of noise reduction units including: signal selection means for (i) sampling, from a received signal, (a) a target signal to be subjected to a noise reduction and (b) a plurality of signals which are away from the target signal by given intervals and (ii) selecting a representative value from sampled signals; voltage determination means for determining which of a determined representative value and a voltage of the target signal is larger; and signal output means for (i) reducing the voltage of the target signal by a given voltage and outputting, as the output signal, the target signal thus reduced, in a case where the voltage of the target signal is determined to be larger than the representative value, (ii) increasing the voltage of the target signal by a given value and outputting, as the output signal, the target signal thus increased, in a case where the voltage of the target signal is determined to be smaller than the representative value, or (iii) outputting, as the output signal, the target signal as it is, in a case where the voltage of the target signal is equal to the representative value, a combination of intervals between a target signal and a plurality of signal excluding the target signal to vary from noise reduction unit to noise reduction unit, a noise reduction unit, which is located on the more upstream side of the plurality of noise reduction units, having a larger maximum value of the intervals between the target signal and the plurality of signal excluding the target signal.

An integrated circuit of the present invention is thus an integrated circuit that outputs an output signal in which noise components mixed in an input signal have been reduced, and the integrated circuit of the present invention includes: a plurality of noise reduction units, cascade-connected to each other, the input signal being supplied to a most upstream side of the plurality of noise reduction units, each of the plurality of noise reduction units including a signal selection circuit, which (i) samples, from a received signal, (a) a target signal to be subjected to a noise reduction and (b) a plurality of signals which are away from the target signal by given intervals and (ii) selects a representative value from sampled signals; a voltage determination circuit, which determines which of a determined representative value and a voltage of the target signal is larger; and a signal output circuit, which (i) reduces the voltage of the target signal by a given voltage and outputs, as the output signal, the target signal thus reduced, in a case where the voltage of the target signal is determined to be larger than the representative value, (ii) increases the voltage of the target signal by a given value and outputs, as the output signal, the target signal thus increased, in a case where the voltage of the target signal is determined to be smaller than the representative value, or (iii) outputs, as the output signal, the target signal as it is, in a case where the voltage of the target signal is equal to the representative value, a combination of intervals between a target signal and a plurality of signal excluding the target signal to vary from noise reduction unit to noise reduction unit, a noise reduction unit, which is located on the more upstream side of the plurality of noise reduction units, having a larger maximum value of the intervals between the target signal and the plurality of signal excluding the target signal.

As such, each time an input signal is passed through a cascade-connected noise reduction unit, noise components mixed in the input signal are gradually reduced in a lower frequency range and gradually increased in a higher frequency range. This causes noise components mixed in a signal outputted from a most downstream side of cascade-connected noise reduction units to be concentrated in a higher frequency range.

The present invention thus including the noise reduction units brings about an effect to cause noise components mixed in an image to appear as if they were reduced, as compared with a conventional art.

For a fuller understanding of the nature and advantages of the invention, reference should be made to the ensuing detailed description taken in conjunction with the accompanying drawings.

Figure 4:
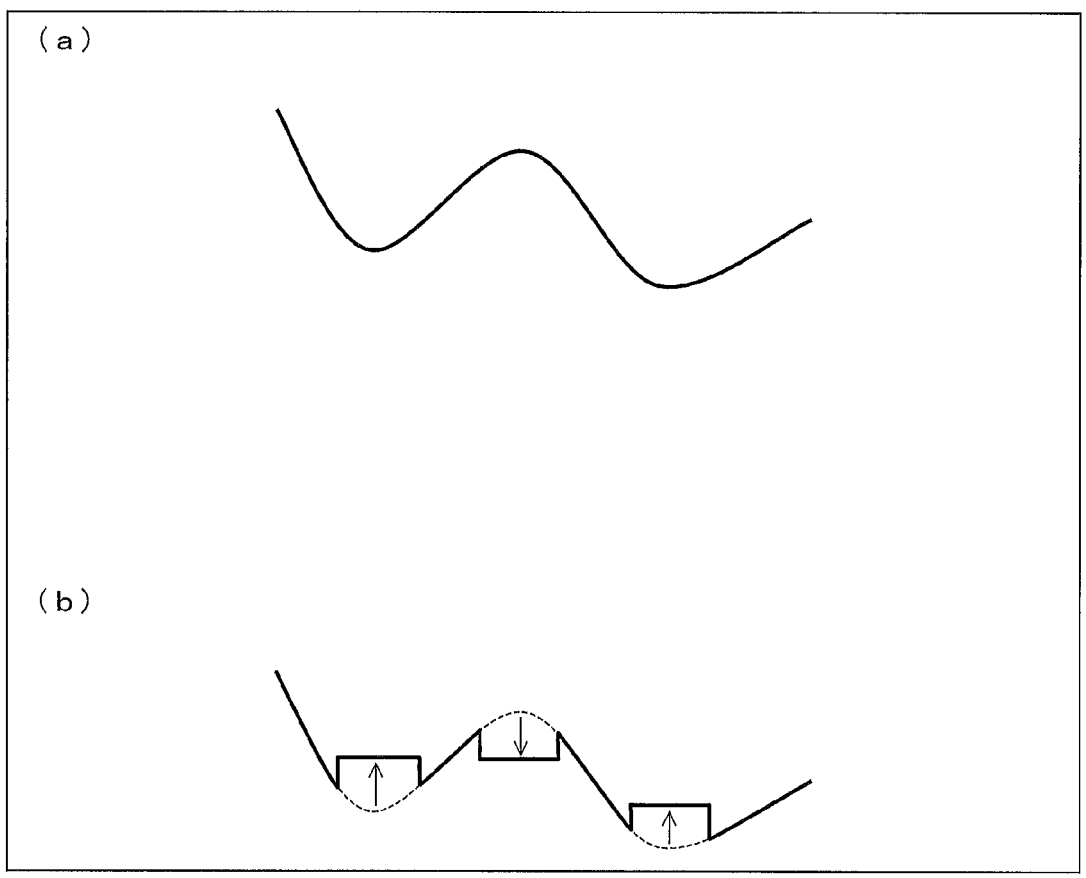

(a) of FIG. 4 is a view schematically illustrating an example waveform of an input signal. (b) of FIG. 4 is a view schematically illustrating an example waveform of an output signal obtained by supplying the input signal (see (a) of FIG. 4) to the noise reduction unit 101 (see FIG. 2).

Figure 2:
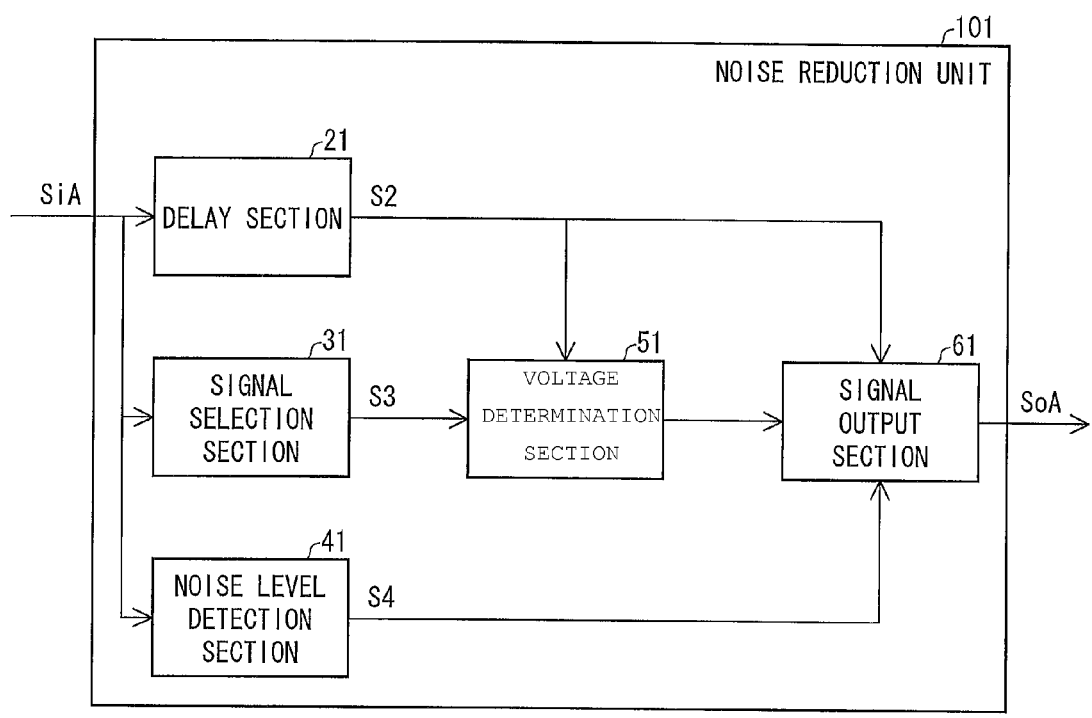
FIG. 2 is a block diagram illustrating how a noise reduction unit included in the signal processing device (see FIG. 1) is configured.
Figure 5:
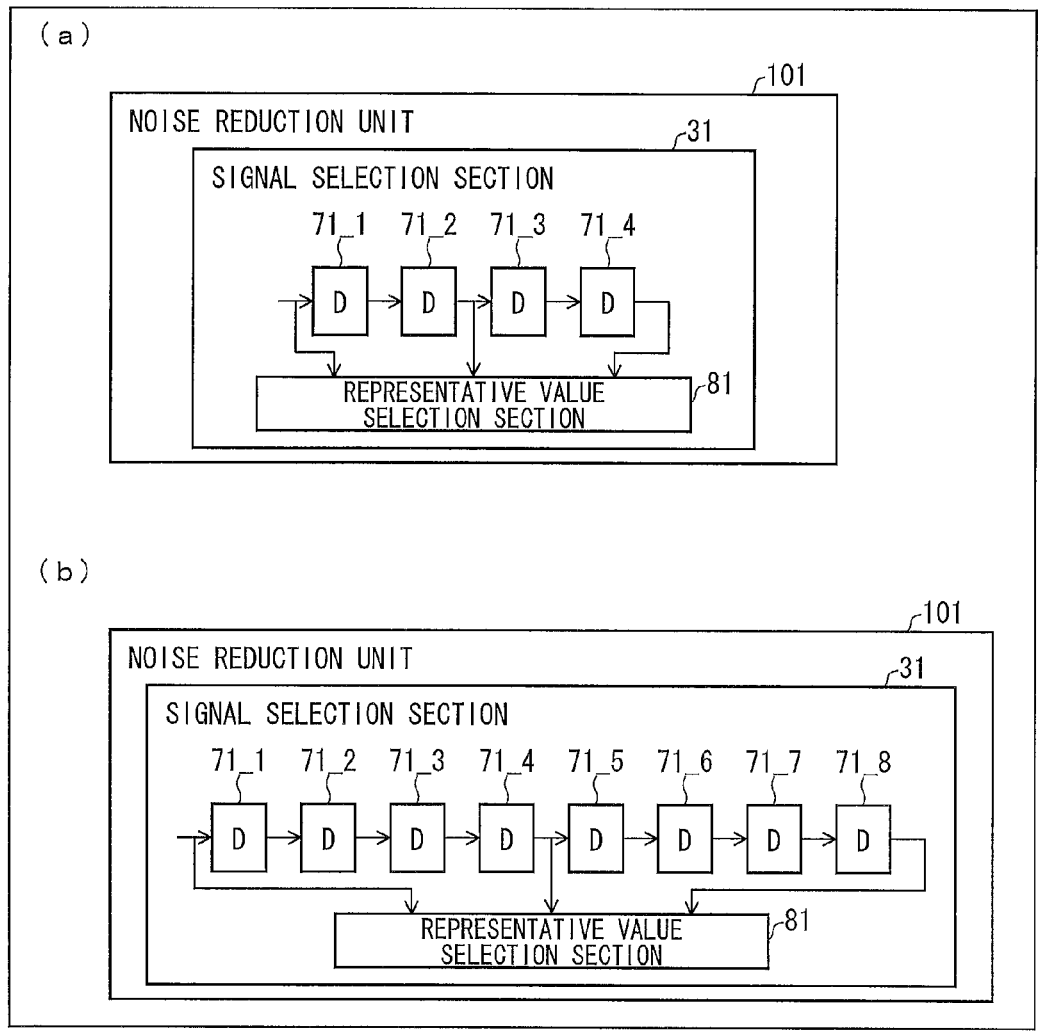

FIG. 5 is a block diagram illustrating an example of the noise reduction unit (see FIG. 2). (a) of FIG. 5 is a block diagram illustrating a main configuration of a noise reduction unit in which a signal selection section including two (2) sample delay circuits is provided. (b) of FIG. 5 is a block diagram illustrating a main configuration of a noise reduction unit in which a signal selection section including four (4) sample delay circuits is provided.

Figure 6:
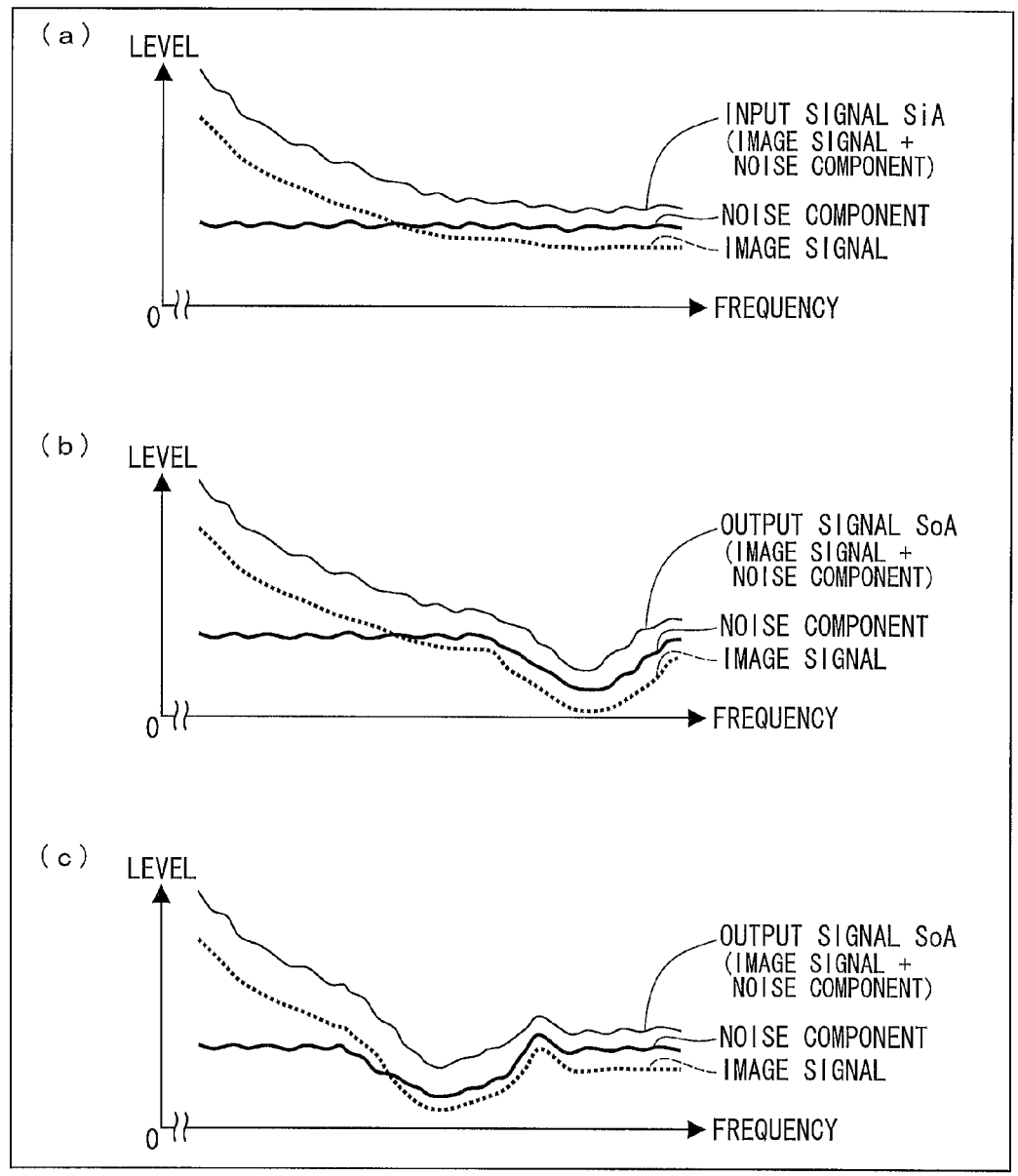

(a) of FIG. 6 is a view schematically illustrating an example waveform of an input signal in which noise components are mixed to an image signal, an example waveform of the image signal in the input signal, and an example waveform of the noise components mixed to the image signal in the input signal. (b) of FIG. 6 is a view schematically illustrating an example waveform of an output signal obtained by supplying the input signal SiA (see FIG. 6) to the noise reduction unit (see (a) of FIG. 5), an example waveform of an image signal in the output signal, and an example waveform of noise components mixed to the image signal in the output signal. (c) of FIG. 6 is a view schematically illustrating an example waveform of an output signal obtained by supplying the input signal (see (a) of FIG. 6) to the noise reduction unit (see (b) of FIG. 5), an example waveform of an image signal in the output signal, and an example waveform of noise components mixed to the image signal in the output signal.

Figure 7:
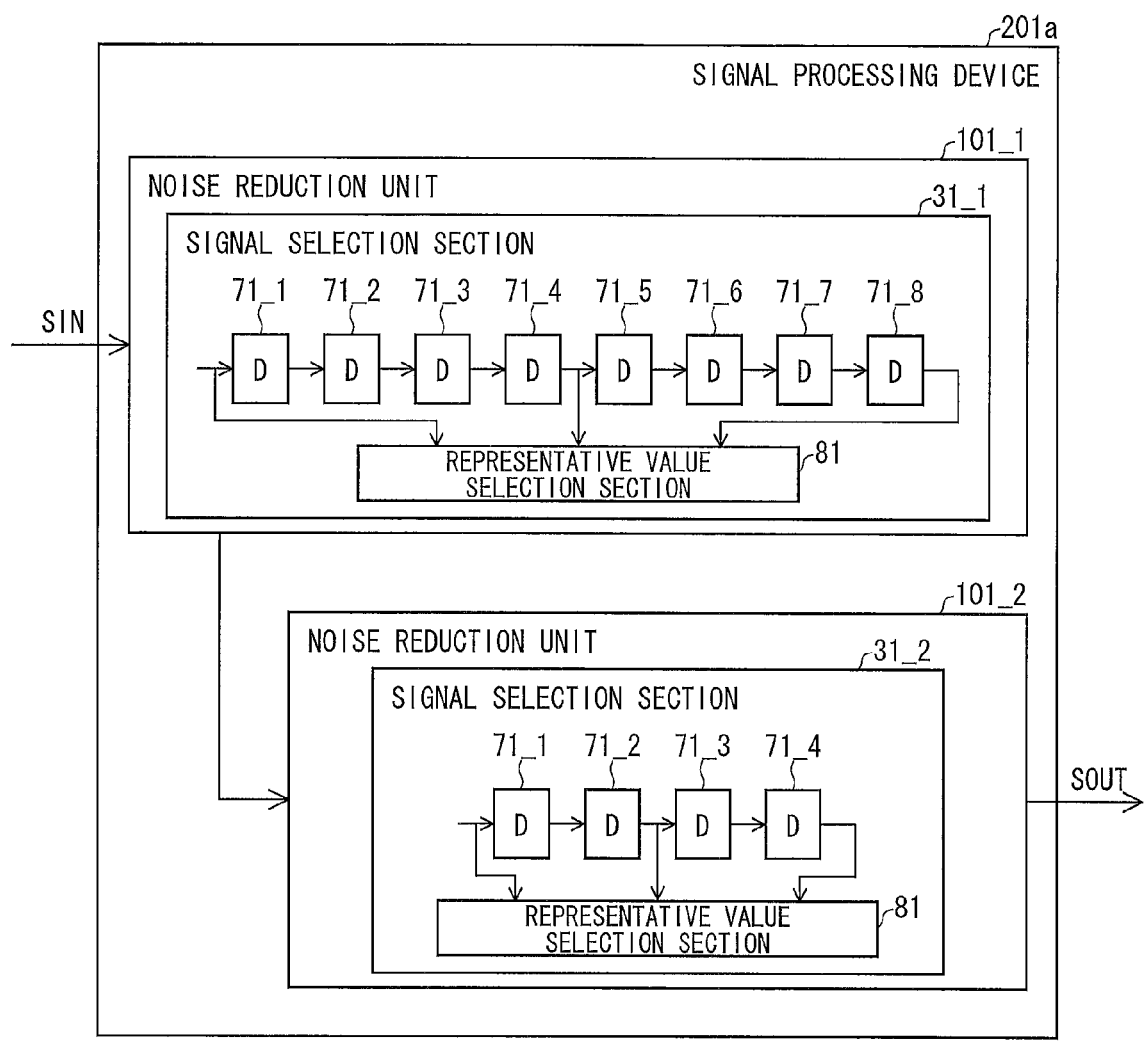

FIG. 7 is a block diagram illustrating a main part of the signal processing device (see FIG. 1) in accordance with a concrete example configuration.

Figure 8:
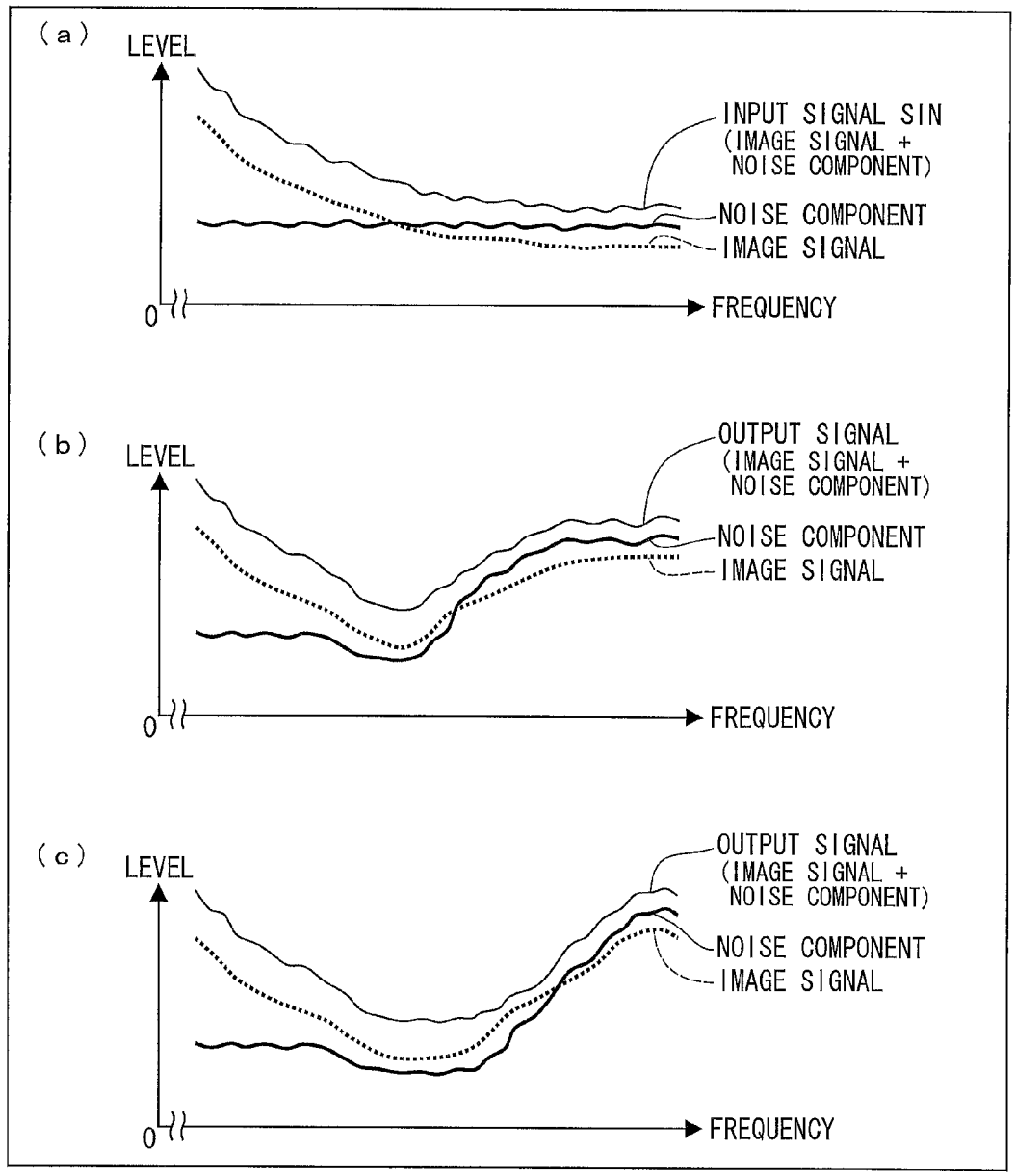

(a) of FIG. 8 is a view schematically illustrating an example waveform of an input signal in which noise components are mixed to an image signal, an example waveform of the image signal in the input signal, and an example waveform of the noise components mixed to the image signal in the input signal. (b) of FIG. 8 is a view schematically illustrating an example waveform of a signal outputted from a noise reduction unit on a most upstream side of cascade-connected noise reduction units in the signal processing device (see FIG. 7), an example waveform of an image signal in the signal, and an example waveform of noise components mixed in the signal. (c) of FIG. 8 is a view schematically illustrating an example waveform of a signal outputted from a noise reduction unit on a second most upstream side on the cascade-connected noise reduction units in the signal processing device (see FIG. 7), an example waveform of an image signal in the signal, and an example waveform of noise components mixed in the signal.

Figure 9:
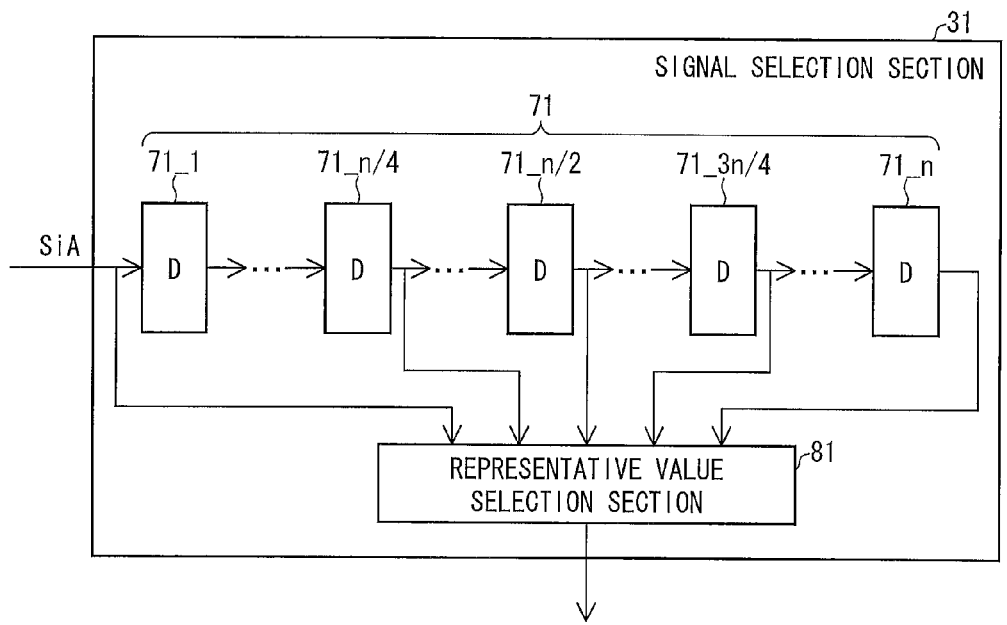

FIG. 9 is a block diagram illustrating an example configuration of a signal selection section in which a representative value is selected from five signals.

Figure 10:
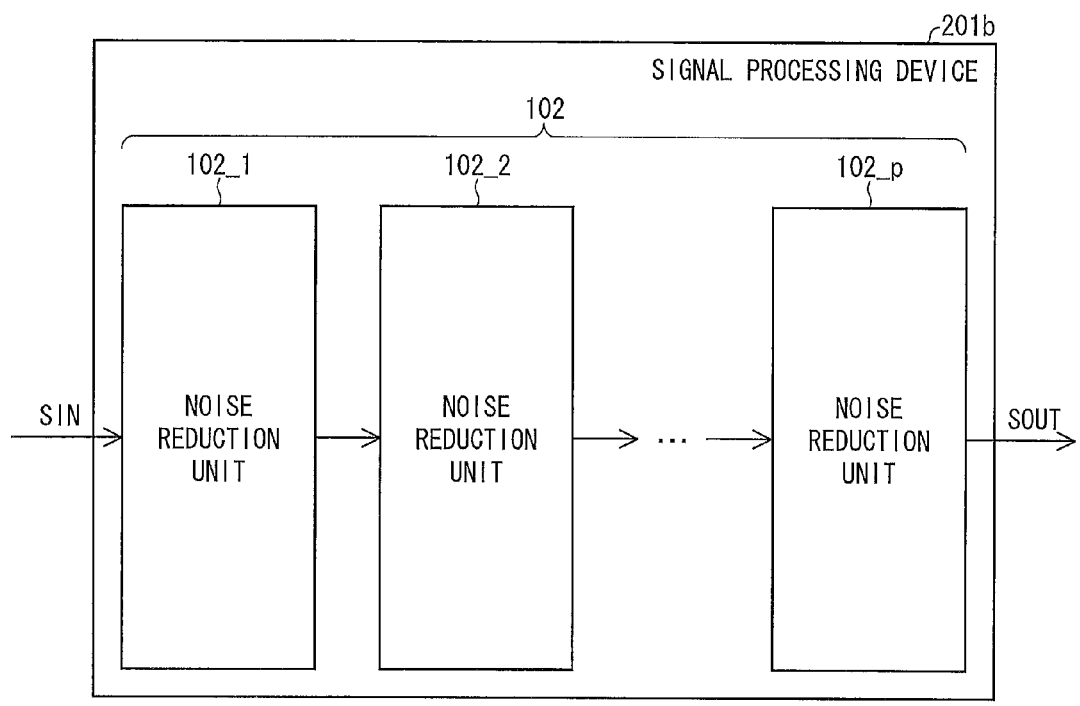

FIG. 10 is a block diagram illustrating how a signal processing device is configured in accordance with a second embodiment of the present invention.

FIG. 11 is a block diagram illustrating how a noise reduction unit included in the signal processing device (see FIG. 10) is configured.

FIG. 12 is a block diagram illustrating how a signal selection section included in the noise reduction unit (see FIG. 11) is configured.

FIG. 13 is a block diagram illustrating an example of the noise reduction unit illustrated in FIG. 11. (a) of FIG. 13 is a block diagram illustrating a main configuration of the noise reduction unit including the signal selection section in which six sample delay circuits are provided so that a first tap number is 4 and a second trap number is 2. (b) of FIG. 13 is a block diagram illustrating a main configuration of the noise reduction unit including the signal selection section in which eight sample delay circuits are provided so that a first tap number is 3 and a second trap number is 5. (c) of FIG. 13 is a block diagram illustrating a main configuration of the noise reduction unit including the signal selection section in which ten sample delay circuits are provided so that a first tap number is 6 and a second trap number is 4.

Figure 14:
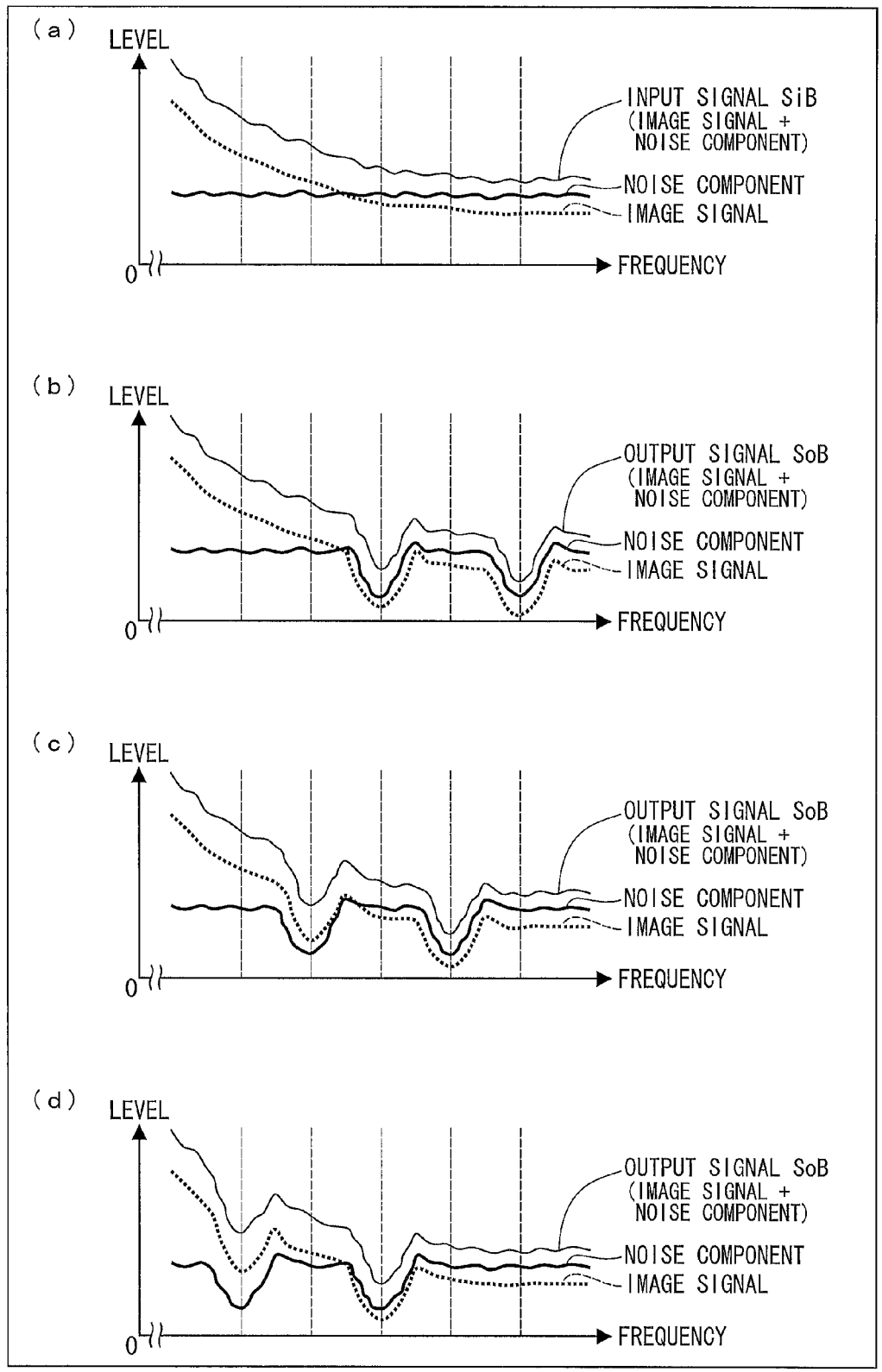

(a) of FIG. 14 is a view schematically illustrating an example waveform of an input signal in which noise components are mixed to an image signal, an example waveform of the image signal in the input signal, and an example waveform of the noise components mixed to the image signal in the input signal. (b) of FIG. 14 is a view schematically illustrating an example waveform of an output signal obtained by supplying the input signal (see (a) of FIG. 14) to the noise reduction unit (see (a) of FIG. 13), an example waveform of an image signal in the output signal, and an example waveform of noise components mixed in the output signal. (c) of FIG. 14 is a view schematically illustrating an example waveform of an output signal obtained by supplying the input signal (see (a) of FIG. 14) to the noise reduction unit (see (b) of FIG. 13), an example waveform of an image signal in the output signal, and an example waveform of noise components mixed to the image signal in the output signal. (d) of FIG. 14 is a view schematically illustrating an example waveform of an output signal obtained by supplying the input signal (see (a) of FIG. 14) to the noise reduction unit (see (c) of FIG. 13), an example waveform of an image signal in the output signal, and an example waveform of noise components mixed to the image signal in the output signal.

Figure 15:
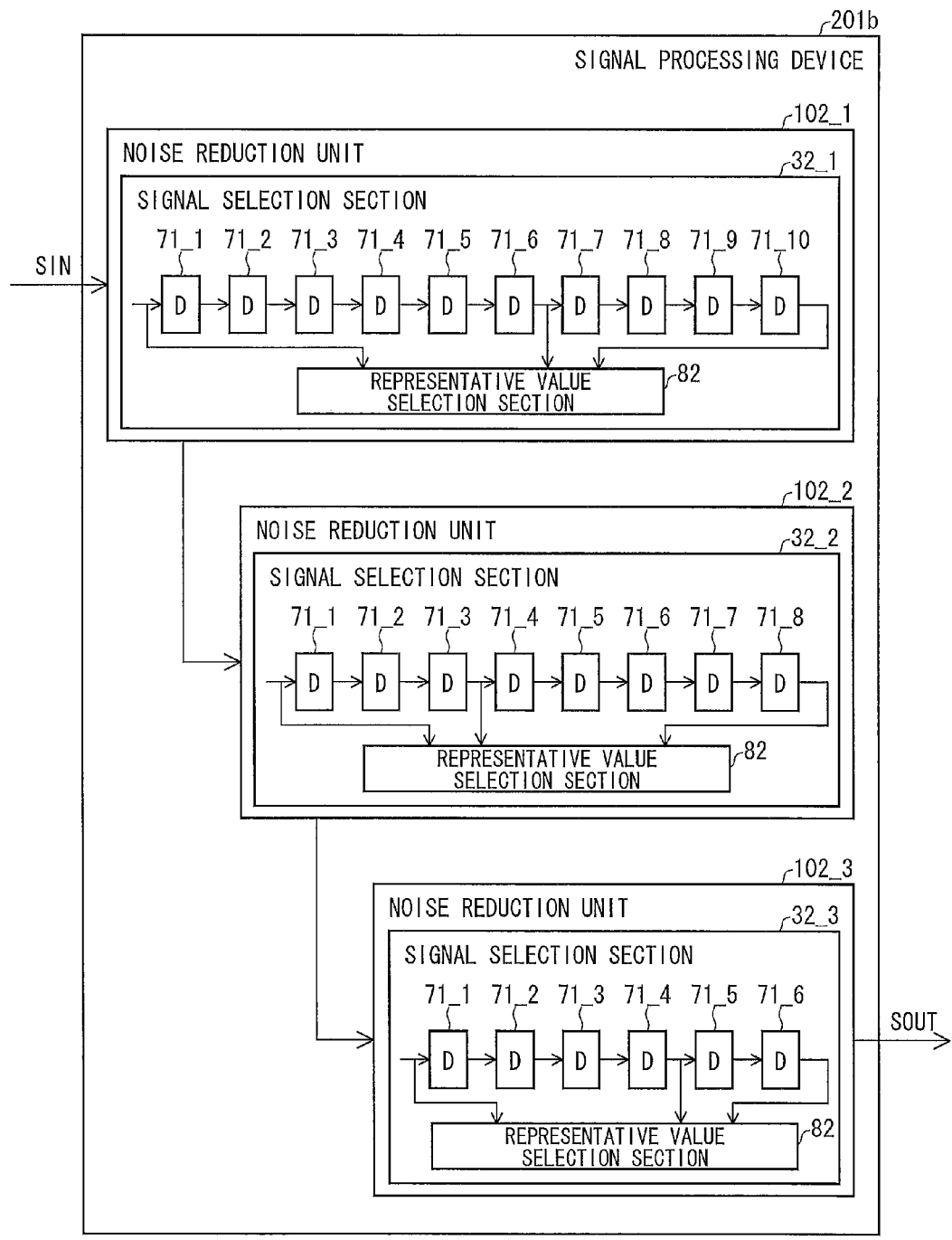

FIG. 15 is block view illustrating a main part of a signal processing device (see FIG. 10) in accordance with a concrete configuration example.

Figure 16:
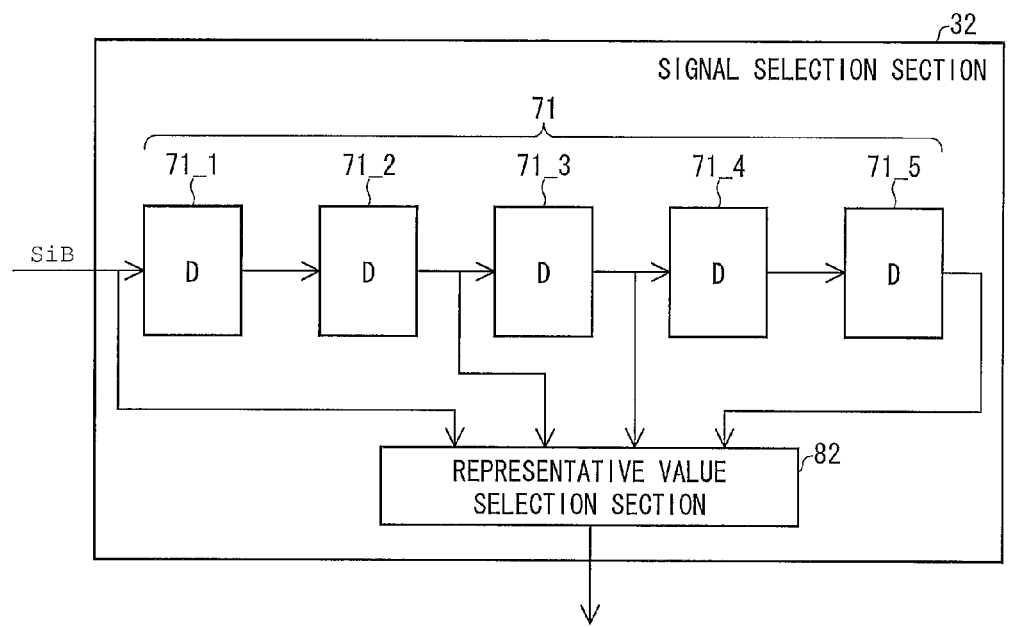

FIG. 16 is a block diagram illustrating an example configuration of a signal selection section in which a median voltage of four signals is selected.

Figure 17:

(a) of FIG. 17 is a view illustrating an example image in which discrete noise components are mixed. (b) of FIG. 17 is a view illustrating an example image obtained after a main scanning direction process and a sub scanning direction process are carried out with respect to the example image (see (a) of FIG. 17) in the signal processing device of the present invention. (c) of FIG. 17 is a view illustrating another example image obtained after the main scanning direction process and the sub scanning direction process are carried out with respect to the example image (see (a) of FIG. 17) in the signal processing device of the present invention. (d) of FIG. 17 is a view illustrating a still another example image obtained after the main scanning direction process and the sub scanning direction process are carried out with respect to the example image (see (a) of FIG. 17) in the signal processing device of the present invention.

Figure 18:
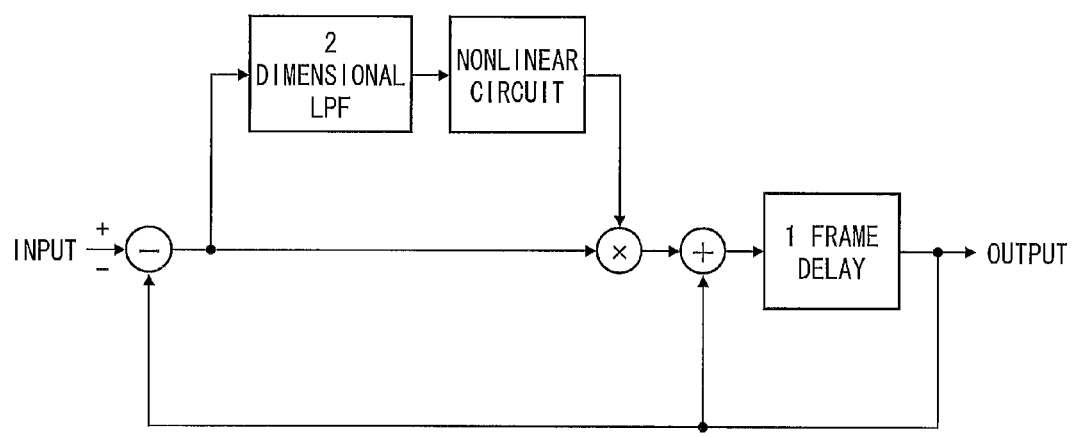

FIG. 18 is a view illustrating a conventional noise reduction circuit in which a recursive filter employing a frame memory is provided.

Figure 19:
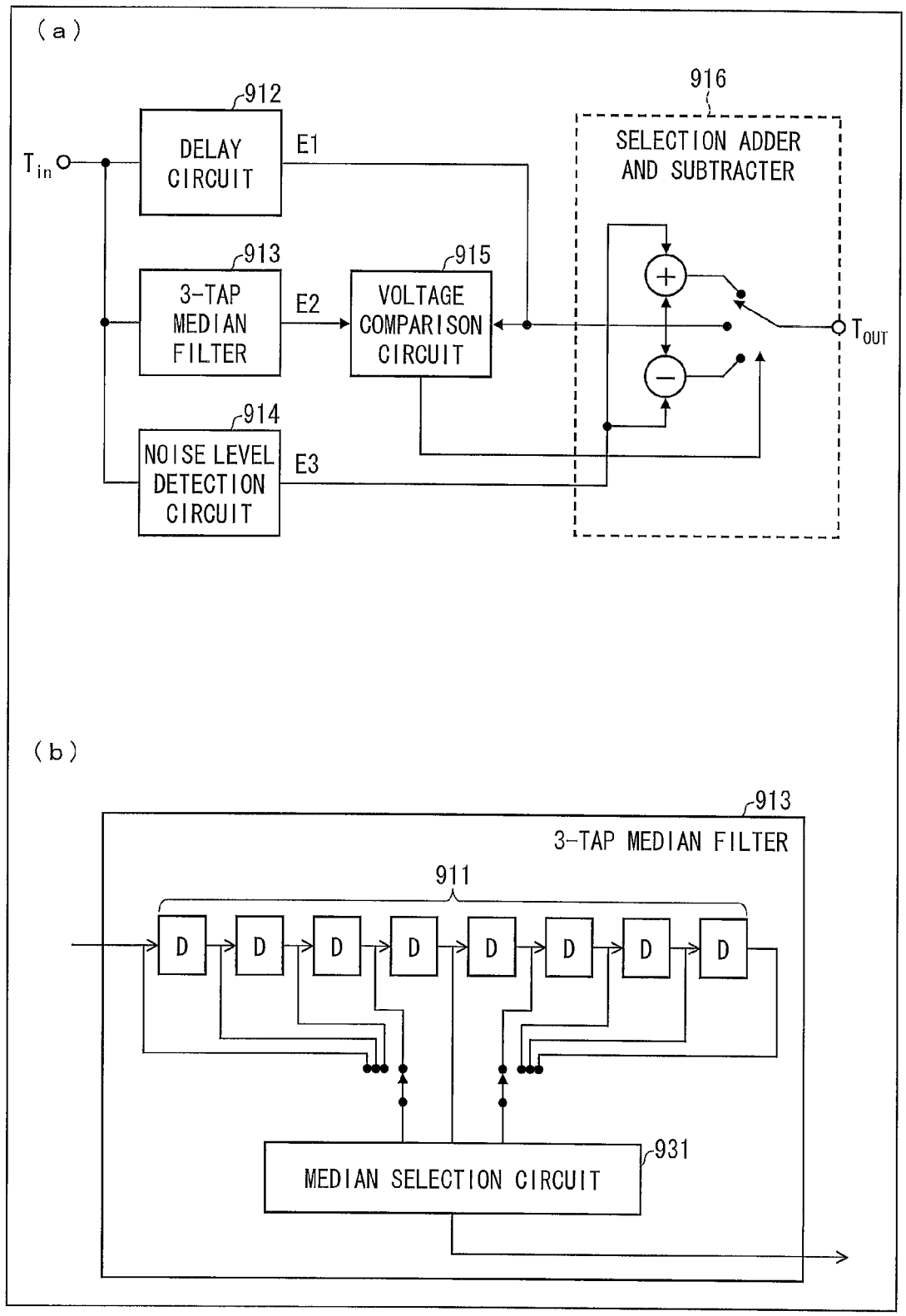

(a) of FIG. 19 is a block diagram illustrating how a noise reduction circuit of Patent Literature 1 is configured. (b) of FIG. 19 is a block diagram illustrating a detail example configuration of a 3-tap median filter in the noise reduction circuit (see (a) of FIG. 19).

DESCRIPTION OF EMBODIMENTS (Brief Description of Signal Processing Device)

Schematically, each signal processing device 201 of Embodiments 1 and 2 is a device for carrying out a process in which noise components (noise) mixed in a received signal are reduced. Hereinafter, such a process is referred to also as a noise component reduction process.

Concrete examples of the signal processing devices 201 include a display device for displaying a still image and a moving image.

The following description will discuss each of Embodiments 1 and 2 on the premise that a signal indicating an image is supplied to a signal processing device 201. Note, however, that Embodiments 1 and 2 are not limited to this. For example, a signal indicating sound can be supplied to the signal processing device 201. That is, the present invention can be applied even to a case where noise components mixed in an audio signal are reduced.

Hereinafter, a signal supplied to the signal processing device 201 is referred to as an input signal SIN, and a signal outputted from the signal processing device 201 is referred to as an output signal SOUT. Note that each of the input signal SIN and the output signal SOUT is a signal, indicating an image (hereinafter referred to as an image signal), in which noise components are mixed. That is, the input signal SIN and the output signal SOUT contain the respective image signals and the respective noise components.

Note that the image indicated by the input signal SIN can be a still image or a moving image. Alternatively, the moving image can be a moving image displayed in real time by a receiver such as a standard definition television (SDTV) receiver or a high definition television (HDTV) receiver.

The following description will discuss each of Embodiments 1 and 2 on the premise that the image signal in the input signal SIN is data strings each made up of pixel values of pixels adjacently arranged in a direction in which a main scanning direction of the image (transverse direction, horizontal direction) extends. Each of Embodiments 1 and 2 is, however, not limited to this. Alternatively, the image signal in the input signal SIN can be data strings each made up of pixel values of pixels adjacently arranged in a direction in which a sub scanning direction of the image (longitudinal direction, vertical direction) extends.

In a case where signal processing devices 201a and 201b (later described) are described without being distinguished from each other, they are each referred to simply as "signal processing device 201".

Embodiment 1

Embodiment 1 of the present invention is described below with reference to FIGS. 1 through 9. A signal processing device (integrated circuit) 201 of Embodiment 1 is referred to as a signal processing device 201a.

(Brief Description of Configuration of Signal Processing Device)

Figure 1:
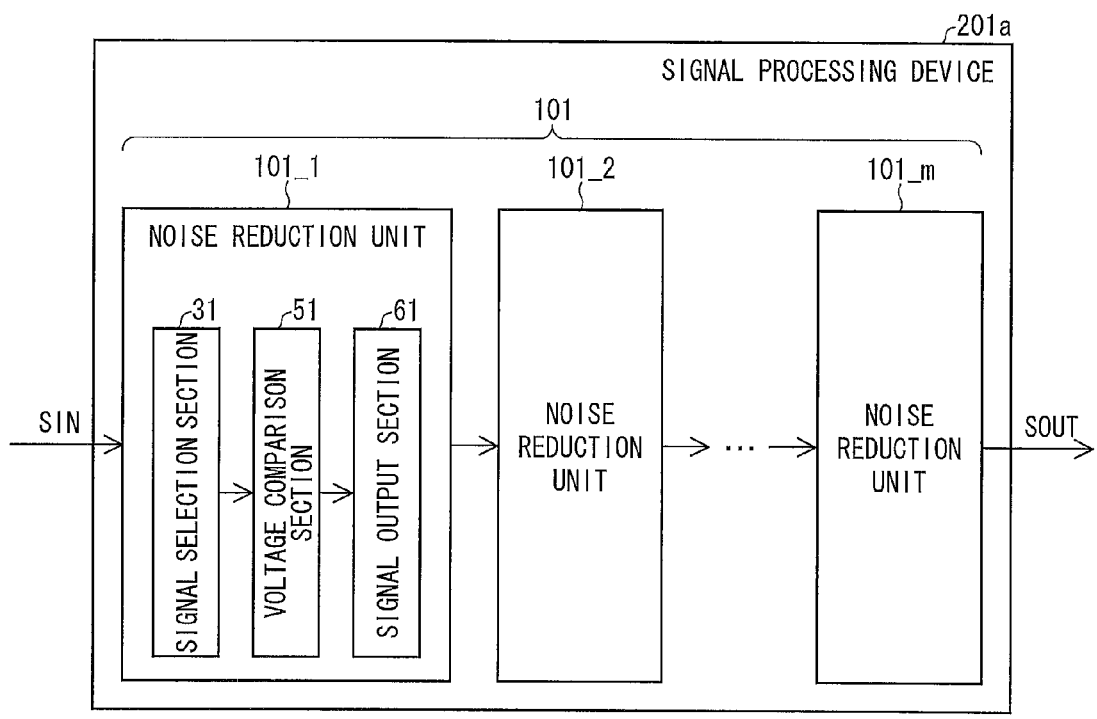
FIG. 1 is a block diagram illustrating how a signal processing device is configured in accordance with a first embodiment of the present invention.

With reference to FIG. 1, the following description will schematically discuss how the signal processing device 201a is configured. FIG. 1 is a block diagram schematically illustrating how the signal processing device 201a is configured. As illustrated in FIG. 1, the signal processing device 201a includes noise reduction units 101_k (k=1, 2, ... m) (where m is a positive integer of 2 or greater) which are cascade-connected to each other.

A noise reduction unit 101_1 is provided on a most upstream side of cascade-connected noise reduction units 101_k, and a noise reduction unit 101_m is provided on a most downstream side of the cascade-connected noise reduction units 101_k. An input signal SIN is supplied to the noise reduction unit 101_1. An output signal SOUT is outputted from the noise reduction unit 101_m.

Note that, in a case where the noise reduction units 101_k are described without being distinguished from each other, they are each referred to simply as a noise reduction unit 101.

(Configuration of Noise Reduction Unit)

With reference to FIG. 2, the following description will discuss how a noise reduction unit 101 is configured. FIG. 2 is a block diagram illustrating how the noise reduction unit 101 is configured. As illustrated in FIG. 2, the noise reduction section 101 includes a delay section 21, a signal selection section (signal selection means, signal selection circuit) 31, a noise level detection section 41, a voltage determination section (voltage determination means, voltage determination circuit) 51, and a signal output section (signal output means, signal output circuit) 61.

Note that, in a case where signal selection sections 31 of the respective noise reduction units 101_k are distinctively described, they are referred to as respective signal selection sections 31_k.

A signal supplied to the noise reduction unit 101 is referred to as an input signal SiA, and a signal outputted from the noise reduction unit 101 is referred to as an output signal SoA.

The delay section 21 is first described below. The delay section 21 appropriately adjusts a timing between an input signal SiA and a signal S3 outputted from the signal selection section 31 and compensates for a delay in the input signal SiA. A signal outputted from the delay section 21 is referred to as a signal S2.

The signal selection section 31 is described below. The signal selection section 31 is a kind of filter for causing a change in waveform of the input signal SiA to be as flat as possible. Note, however, that the signal selection section 31 has a characteristic in which a rising edge or a falling edge of the input signal SiA is maintained. A signal outputted from the signal selection section 31 is referred to as the signal S3.

Figure 3:
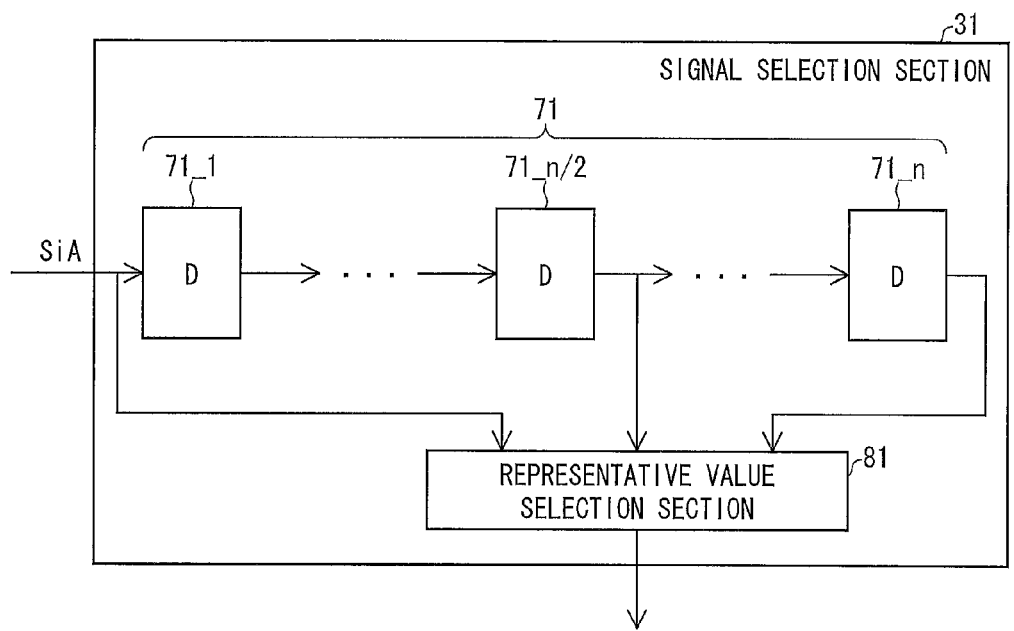
FIG. 3 is a block diagram illustrating how a signal selection section included in the noise reduction unit (see FIG. 2) is configured.

FIG. 3 illustrates a detail example configuration of the signal selection section 31. FIG. 3 is a block diagram illustrating the detail example configuration of the signal selection section 31. As illustrated in FIG. 3, the signal selection section 31 includes (i) a plurality of sample delay circuits 71 which are cascade-connected to each other and (ii) a representative value selection section 81. The plurality of sample delay circuits 71 are simply referred to as "D" in FIG. 3, instead of being referred to as "sample delay circuits". This is also true for other drawings.

Note that, in a case where the plurality of sample delay circuits 71 in the signal selection section 31 are distinctly described, they are referred to as respective sample delay circuits 71_h (h=1, 2, ..., n) (where n is a positive even number of 2 or greater).

The number n (tap number) of sample delay circuits 71 varies from noise reduction unit 101 to noise reduction unit 101. It is preferable that more sample delay circuits 71 are provided as the noise reduction unit 101_k is located on a more upstream side (later described). That is, it is preferable that the number of taps is increased as the noise reduction units 101_k is located on a more upstream side of the cascade-connected noise reduction units.

Each of the plurality of sample delay circuits 71 outputs a signal which is delayed, by a unit of time, from a received signal. The representative value selection section 81 (i) selects, as a representative value, a median voltage of the following three signals, namely, (a) a signal supplied to a sample delay circuit 71_1, (b) a signal outputted from a sample delay circuit 71_(n/2), and (c) a signal outputted from a sample delay circuit 71_n, and (ii) outputs a selected median voltage.

Note that, although Embodiment 1 will deal with a case where the representative value selection section 81 selects a representative value from the three (3) signals, Embodiment 1 is not limited to this. Alternatively, the representative value selection section 81 can select a representative value from four (4) or more signals. Another example configuration of the signal selection section 31 is later described.

Note that signals, from which the representative value selection section 81 selects a representative value, are referred to also as "sampled signals." That is, (i) the signal supplied to the sample delay circuit 71_1, (ii) the signal outputted from the sample delay circuit 71_(n/2), and (iii) the signal outputted from the sample delay circuit 71_n are respective sampled signals.

In a case where signals, from which the representative value selection section 81 selects a representative value, are thus referred to as sampled signals, the signal selection section 31 can be described also as "(i) sampling, from a received signal, (a) a target signal which will be subjected to a noise reduction and (b) a plurality of signals which are away from the target signal by given intervals, and (ii) selecting a representative value from the sampled signals. In this case, the target signal, which will be subjected to the noise reduction, is a signal outputted from the sample delay circuit 71_(n/2), and the plurality of signals away from the target signal by given intervals are the signal supplied to the sample delay circuit 71_1 and the signal outputted from the sample delay circuit 71_n.

Each of the sample delay circuits 71 can be configured to (1) output a signal delayed, by a unit of time, in a main scanning direction of an image (transverse direction, horizontal direction) indicated by an input signal, (2) output a signal delayed, by a unit of time, in a sub scanning direction of an image (longitudinal direction, vertical direction) indicated by an input signal, and (3), in a case where an input signal SIN is a signal indicating a moving image, output a signal delayed, by a unit of time (for each frame), in a time direction of the moving image indicated by the input signal SIN. Note, however, that sample delay circuits 71 included in a same noise reduction unit 101 employ any of the configurations (1) through (3).

The representative value selection section 81 is thus configured so as to select a median value as a representative value. Embodiment 1, however, is not limited to this. For example, the representative value selection section 81 can be configured so as to find a mean value as a representative value. Note that, in a case where the representative value selection section 81 selects a median value as a representative value, the signal selection section 31 serves as a median filter whose tap number is n (so-called n tap).

The sample delay circuits 71_1 through 71_(n/2) in the signal selection section 31 are collectively referred to as a "first tap" in the signal selection section 31, and the number of the sample delay circuits 71_1 through 71_(n/2) is referred to as a "first tap number" in the signal selection section 31. Similarly, the sample delay circuits 71_((n/2)+1) through 71_n in the signal selection section 31 are collectively referred to as a "second tap" in the signal selection section 31, and the number of the sample delay circuits 71_((n/2)+1) through 71_n is referred to as a "second tap number" in the signal selection section 31. In this case, the first tap number and the second tap number in the signal selection section 31 are equal to each other. As such, the signal selection section 31 is referred to also as a symmetric filter. Note that it is desirable that each of the first tap number and the second tap number is about 10 at most.

Note that an interval between sampled signals vary depending on the first tap number and the second tap number. As such, intervals, at which the sampling is carried out, are uniform (equal to each other) for each of the noise reduction units 101_k.

Note, however, that the noise reduction units 101_k have respective different combinations of first and second tap numbers. This causes a combination of intervals between a target signal and a plurality of sampled signal excluding the target signal to vary from noise reduction unit 101 to noise reduction unit 101.

The noise level detection section 41 is described below. For example, the noise reduction section 41 (i) detects noise components of a line part which has no image signal during a vertical blanking period of an input signal, (ii) converts a level of the noise component into a direct voltage, and (iii) outputs the direct voltage. Note that, in a case where the input signal has no blanking period, a given voltage corresponding to a noise component is outputted from the noise level detection section 41. A signal outputted from the noise level detection section 41 is referred to as a signal S4.

The voltage determination section 51 is described below. The voltage determination section 51 determines which of signals S2 and S3 is greater in voltage. That is, the voltage determination section 51 determines whether a voltage of the signal S2 is greater than, smaller than, or equal to a voltage of the signal S3. Then, the voltage determination section 51 informs the signal output section 61 of a determined result.

The signal output section 61 is described below. The signal output section 61 outputs an output signal SoA in accordance with the result determined by the voltage determination section 51.

Specifically, in a case where the signal S2 is greater than the signal S3 in voltage, the signal output section 61 outputs, as an output signal SoA, a signal voltage obtained by subtracting the voltage of the signal S4 from the voltage of the signal S2. In contrast, in a case where the signal S2 is smaller than the signal S3 in voltage, the signal output section 61 outputs, as an output voltage SoA, a signal voltage obtained by adding the voltage of the signal S4 to the voltage of the signal S2. In a case where the signal S2 is equal to the signal S3 in voltage, the signal output section 61 outputs, as it is (i.e., without changing a voltage of the signal S2), the signal S2 as an output signal SoA.

Note that the output signal SoA thus generated in the noise reduction unit 101 contains harmonic components which are not contained in the input signal SiA. This will be described below with reference to FIG. 4. (a) of FIG. 4 is a view schematically illustrating an example waveform of the input signal SiA. (b) of FIG. 4 is a view schematically illustrating an example output signal SoA obtained in a case where the input signal SiA (see (a) of FIG. 4) is supplied to the noise reduction unit 101.

As early described, the signal output section 61 carries out addition or subtraction of the voltage of the signal S2. This causes the waveform of the output signal SoA to have parts each having a substantially recessed shape (hereinafter referred to as recessed parts) (see (b) of FIG. 4). As such, the output signal SoA contains the harmonic components which are not contained in the input signal SiA. That is, it can be also said that the input signal SiA is partially concentrated in a higher frequency range in the noise reduction unit 101. This ultimately causes noise components mixed in the input signal SiA to be partially concentrated in a higher frequency range.

Most of the harmonic components do not affect human visual perception. This is because human visual characteristics have a feature similar to a low-pass filter or a bandpass filter. Namely, it is difficult for humans to recognize, as noise components, the noise components thus concentrated in the higher frequency range.

On this account, noise components mixed in the input signal SiA are concentrated in a higher frequency range in the output signal SoA. It thus becomes difficult for humans to recognize such noise components. This allows the noise reduction unit 101 to reduce noise components.

Note that the recessed parts illustrated in (b) of FIG. 4 are illustrative only, and their widths are determined in accordance with intervals at which the sampling of sampled signals is carried out, that is, in accordance with the number of taps.

(How to Reduce Noise Component in One Noise Reduction Unit)

With reference to FIGS. 5 and 6, the following description will discuss how one (1) noise reduction unit 101 reduces noise components.

FIG. 5 is a block diagram illustrating main configuration of a noise reduction unit 101 described below. (a) of FIG. 5 is a block diagram illustrating a main configuration of the noise reduction unit 101 in which a signal selection section 31 including four (4) sample delay circuits 71 (sample delay circuits 71_1 through 71_4) are provided. In this case, each of first tap number and second tap number is "2". As such, the noise reduction unit 101 carries out sampling with intervals of "+2" and "−2" from a signal outputted from a sample delay circuit 71_2.

(b) of FIG. 5 is a block diagram illustrating a main configuration of a noise reduction unit 101 in which a signal selection section 31 including eight sample delay circuits 71 (sample delay circuits 71_1 through 71_8) are provided. In this case, each of first tap number and second tap number is "4". As such, the noise reduction unit 101 carries out sampling with intervals of "+4" and "−4" from a signal outputted from a sample delay circuit 71_4.

It is assumed that an input signal SiA, having a waveform as illustrated in (a) of FIG. 6, is supplied to each of the noise reduction units 101 (see (a) and (b) of FIG. 5). (a) of FIG. 6 is view schematically illustrating an example waveform of the input signal SiA in which noise components are mixed to an image signal, an example waveform of the image signal in the input signal SiA, and an example waveform of the noise components mixed to the image signal in the input signal SiA.

(b) of FIG. 6 is a view schematically illustrating an example waveform of an output signal SoA obtained by supplying the input signal SiA (see (a) of FIG. 6) to the noise reduction unit 101 (see (a) of FIG. 5), an example waveform of an image signal in the output signal SoA, and an example waveform of noise components mixed to the image signal in the output signal SoA.

Since the number of taps in the noise reduction section 101 (see (a) of FIG. 5) is small, the noise reduction unit 101 (see (a) of FIG. 5) carries out a noise reduction with respect to a high frequency range of the input signal SiA (see (b) of FIG. 6).

(c) of FIG. 6 is a view schematically illustrating an example waveform of an output signal SoA obtained by supplying the input signal SiA (see (a) of FIG. 6) to the noise reduction unit 101 (see (b) of FIG. 5), an example waveform of an image signal in the output signal SoA, and an example waveform of noise components mixed to the image signal in the output signal SoA.

Since the number of taps in the noise reduction unit 101 illustrated in (b) of FIG. 5 is larger than that in the noise reduction unit 101 illustrated in (a) of FIG. 5, the noise reduction unit 101 illustrated in (b) of FIG. 5 carries out a noise reduction with respect to a low frequency range of the input signal SiA (see (c) of FIG. 6). That is, the more the number of the sampling delay units 71 in the noise reduction units 101 is, the more noise components are reduced in a lower frequency range of the input signal SiA.

Note that, although a level of the image signal is also reduced (see (b) and (c) of FIG. 6), the noise components are reduced. As such, a viewer will get an impression that an image as a whole is more finely (vividly) than an original image.

As such, by using two or more different noise reduction units 101 which are cascade-connected to each other, it is possible to greatly reduce noise components, mixed in an input signal SIN, in different frequency ranges.

(Concrete Example Configuration of Signal Processing Device)

With reference to FIG. 7, the following description will discuss a concrete example configuration of a signal processing device 201a. FIG. 7 is a block diagram illustrating a main part of the signal processing device 201a in accordance with the concrete example configuration. The signal processing device 201a (see FIG. 7) includes two noise reduction units 101. That is, a noise reduction unit 101 as illustrated in (b) of FIG. 5 is used as a noise reduction unit 101_1, and a noise reduction unit 101 as illustrated in (a) of FIG. 5 is used as a noise reduction unit 101_2. These two noise reduction units 101 are cascade-connected to each other. For convenience, the concrete example configuration will deal with a case where two noise reduction units 101 are cascade-connected to each other. Note, however, that the number of noise reduction units 101 which are cascade-connected to each other is not limited to two, provided that the number of noise reduction units 101 is more than one.

With the configuration, an input signal SIN supplied to the signal processing device 201a is subjected to a noise component reduction in the noise reduction unit 101_1, and is further subjected to a noise component reduction in the noise reduction unit 101_2.

Note that (i) the number of sample delay circuits 71 (tap number) in a signal selection sections 31_1 in the noise reduction unit 101_1 is different from (ii) the number of sample delay circuit 71 (tap number) in a signal selection sections 31_2 in the noise reduction unit 101_2. As such, the noise reduction unit 101_1 is different from the noise reduction unit 101_2 in a combination of intervals between a target signal and a plurality of sampled signal excluding the target signal. Specifically, a combination of sample intervals of "+2" and "−2" in the noise reduction unit 101_1 is different from a combination of intervals of "+4" and "−4" in the noise reduction unit 101_2.

This causes the noise reduction units 101_1 and 101_2 to reduce respective noise components whose frequency ranges are different from each other.

Specifically, the noise reduction unit 101_1 reduces noise components in one frequency range, whereas the noise reduction unit 101_2 reduces noise components in another frequency range which is higher than the one frequency range.

As early described, each noise reduction unit 101 outputs an output signal SoA which is partially concentrated in the higher frequency range in an input signal SiA. It is preferable to configure the noise reduction units 101_1 and 101_2 so that (i) the noise reduction unit 101_1, in which the signal selection section 31_1 whose tap number is large is included, carries out a process with respect to a low frequency range of the input signal SIN and then (ii) the noise reduction unit 101_2, in which the signal selection section 31_2 whose tap number is small is provided, carries out a process with respect to a high frequency range of the input signal SIN (see FIG. 7). With the configuration, it is possible that, each time an input signal SiA is passed through a noise reduction section 101, noise components mixed in the input signal SiA are gradually concentrated in a higher frequency range. This causes noise components, mixed in an output signal SoA outputted from the noise reduction unit 101_2 on a most downstream side of the cascade-connected noise reduction units 101, to be concentrated in a high frequency range of the output signal SoA. It follows that noise components in a low frequency range of the output signal SoA have been reduced.

FIG. 8 illustrates how the noise components are concentrated in a higher frequency range by the signal processing device 201a (see FIG. 7). (a) of FIG. 8 is a view schematically illustrating an example waveform of an input signal SIN, an example waveform of an image signal in the input signal SIN, and an example waveform of a noise component mixed in the input signal SIN.

(b) of FIG. 8 is a view schematically illustrating an example waveform of a signal outputted from the noise reduction unit 101_1, an example waveform of an image signal in the signal, and an example waveform of a noise component mixed in the signal. As illustrated in (b) of FIG. 8, the image signal and the noise components are concentrated in a higher frequency range, as compared to the image signal and the noise components illustrated in (a) of FIG. 8, respectively.

(c) of FIG. 8 is a view schematically illustrating an example waveform of a signal outputted from the noise reduction unit 101_2, an example waveform of an image signal in the signal, and an example waveform of a noise component mixed in the signal. As illustrated in (c) of FIG. 8, the image signal and the noise components are concentrated in a higher frequency range, as compared to the image signal and the noise components illustrated in (b) of FIG. 8, respectively.

The noise components mixed in the input signal have a wide distribution, with relatively uniform levels, from a low frequency range to a high frequency range. However, even though the noise components thus have relatively uniform levels, it is hard for humans to perceive noise components in a high frequency range, whereas it is easy for humans to perceive noise components in a low frequency range. This is because human visual characteristics have a feature similar to a low-pass filter or a feature similar to a bandpass filter. As such, it is possible to improve an image quality, by reducing energies (levels) of the noise components in low and medium frequency ranges. In contrast, even in a case where energies of the noise components in the high frequency range are increased, humans do not perceive such an increase as a noise increase. As such, an image quality is improved by thus causing the noise components to be concentrated in the high frequency range by use of the signal processing device illustrated in FIG. 7 (see (c) of FIG. 8).

Note that, as described with reference to FIG. 5, which frequency range is subjected to a process is determined depending on the number of the sample delay circuits 71 (the number of taps). Because the number of taps in the noise reduction unit 101 (see (a) of FIG. 5) is 2 and thereby small, the process is carried out to a high frequency range. In contrast, the number of taps in the noise reduction unit 101 (see (b) of FIG. 5) is 4 so that the process is carried out to a frequency range lower than the high frequency range. Note that, in order to carry out the process to a highest frequency range, it is necessary to set the number of taps to 1.

The noise components are thus gradually concentrated in the higher frequency range, in each of two or more noise reduction units 101. This ultimately causes the noise components to be so small that it is difficult for human visual sense to detect the noise components. That is, it is possible to make it difficult for humans to view the noise components. As such, it is possible to greatly reduce the noise components.

Therefore, with the signal processing device 201a, it is possible to greatly reduce the noise components mixed in the input signal SIN.

(Modification Example of Signal Selection Section)

The description has discussed the case where the representative value selection section 81 in the signal selection section 31 selects, as a representative value, the median voltage of the following three signals, namely, (i) the signal inputted to the sample delay circuit 71_1, (ii) the signal outputted from the sample delay circuit 71_(n/2), and (iii) the signal outputted from the sample delay circuit 71_n. However, the representative value selection section 81 in the signal selection section 31 can be configured to select a median voltage of four or more signals. This makes it possible to detect a more subtle change in signal. As such, even in an image, such as a grass image or a fog image, in which a change in signal is fine, for example, it is possible to detect a small change in signal. This makes it possible to reduce noise components in the image.

An example configuration is illustrated in FIG. 9. FIG. 9 is a block diagram illustrating an example configuration in which a representative value is selected from the following five signals, namely (i) a signal supplied to the sample delay circuit 71_1, (ii) a signal outputted from the sample delay circuit 71_(n/4), (iii) a signal outputted from the sample delay circuit 71_(n/2), (iv) a signal outputted from the sample delay circuit 71_(3n/4), and (v) a signal outputted from the sample delay circuit 71_n.

Embodiment 2

Embodiment 1 has discussed the noise reduction unit 101 including the signal selecting units 31 in which the first and second tap numbers are equal to each other. The present invention is, however, not limited to this. Embodiment 2 will discuss a signal processing device 201 in which noise reduction units, each of which includes a signal selection section whose first and second tap numbers are not equal to each other, are cascade-connected to each other.

A noise reduction unit, which includes a signal selection section whose first and second tap numbers are not equal to each other, unsymmetrically reduces noise components in first and second regions, which are divided by an edge in an image, which edge serves as a boarder between the first and second regions. Note, however, that since there is no correlation between noise components and an image signal, such an unsymmetrical reduction in the noise components causes no problem.

Embodiment 2 will be described below with reference to FIGS. 10 through 16. The signal processing device 201 of Embodiment 2 is referred to as a signal processing device 201b. Note that, for convenience, members having functions identical to those of the members described in Embodiment 1 are given identical reference numerals, and their explanations are omitted here unless otherwise noted.

(Brief Description of Configuration of Signal Processing Device)

With reference to FIG. 10, the following description will schematically discuss how the signal processing device 201 is configured. FIG. 10 is a block diagram schematically illustrating how the signal processing device 201b is configured.

As illustrated in FIG. 10, the signal processing device 201b includes noise reduction units 102_r (r=1, 2, ..., p) (where p is a positive integer of 2 or greater) which are cascade-connected to each other.

A noise reduction unit 102_1 is provided on a most upstream side of cascade-connected noise reduction units 102, and a noise reduction unit 102_p is provided on a most downstream side of the cascade-connected noise reduction units 102. An input signal SIN is supplied to the noise reduction unit 102_1. An output signal SOUT is outputted from the noise reduction unit 102_p.

Note that, in a case where the noise reduction units 102_r are described without being distinguished from each other, they are each referred to simply as "noise reduction unit 102".

(Configuration of Noise Reduction Unit)

With reference to FIGS. 11 and 12, the following description will discuss how a noise reduction unit 102 is configured. FIG. 11 is a block diagram illustrating how the noise reduction unit 102 is configured.

As illustrated in FIG. 11, each noise reduction unit 102 includes a delay section 21, a signal selection section (signal selecting means, signal selecting circuit) 32, a noise level detection section 41, a voltage determination section 51, and a signal output section 61. That is, the each signal reduction unit 102 is different from the signal reducing unit 101 of Embodiment 1 in that the signal selection section 32 is provided instead of the signal selection section 31.

Note that, in a case where signal selection sections 32 of the respective noise reduction units 102_r are distinctively referred, they are referred to as respective signal selection sections 32_r.

Note, also, that a signal supplied to each noise reduction unit 102 is referred to as an input signal SiB, and a signal outputted from the each noise reduction unit 102 is referred to as an output signal SoB.

Also note that descriptions of the delay section 21, the noise level detection section 41, the voltage determination section 51, and the signal output section 61 are omitted here. This is because they are identical to the delay section 21, the noise level detection section 41, the determination section 51, and the signal output section 61 described in Embodiment 1.

The signal selection section 32 serves as a kind of filter for causing a change in waveform of the input signal SiB to be as flat as possible. FIG. 12 illustrates a detail example configuration of the signal selection section 32. As illustrated in FIG. 12, the signal selection section 32 includes (i) a plurality of sample delay circuits 71, which are cascade-connected to each other, and (ii) a representative value selection section 82.

Note that, in a case where the plurality of sample delay circuits 71 in the signal selection section 32 are distinctively referred, they are referred to as respective sample delay circuits 71_q (q=1, 2, ..., t) (where t is a positive integer of 2 or greater).

Embodiment 2 deals with a case where numbers t (tap number) of sample delay circuits 71 varies from noise reduction unit 102 to noise reduction unit 102. It is preferable that more sample delay circuits 71 are provided as a noise reduction unit 102_r is located on a more upstream side (later described). That is, it is preferable that the number of taps is increased as the noise reduction unit 102_r is located on a more upstream side of the cascade-connected noise reduction units.

The representative value selection section 82 (i) selects, as a representative value, a median voltage of the following three signals namely, namely, (a) a signal supplied to the sample delay circuit 71_1, (ii) a signal outputted from a sample delay circuit 71_u (where u is an integer of 1 or greater but not greater than t−1; note, however, that u≠t/2), and (c) a signal outputted from a sample delay circuit 71_t, and (ii) outputs a selected median voltage.

Note that, although Embodiment 2 will deal with a case where the representative value selection section 82 selects a representative value from voltages of three signals, Embodiment 2 is not limited to this. Alternatively, the representative value selection section 82 can select a representative value from four or more signals. Another example configuration of the signal selection section 31 is later described.

Note that signals, from which the representative value selection section 82 selects a representative value, are referred to also as "sampled signals." That is, (i) the signal supplied to the sample delay circuit 71_1, (ii) the signal outputted from the sample delay circuit 71_u (u is an integer of 1 or greater but not greater than t−1; note, however, that u≠t/2), and (iii) the signal outputted from the sample delay circuit 71_t are respective sampled signals.

In a case where signals, from which the representative value selection section 81 selects a representative value, are thus referred to as sampled signals, the signal selection section 32 can be described also as "(i) sampling, from a received signal, (a) a target signal which will be subjected to a noise reduction and (b) a plurality of signals which are away from the target signal by given intervals, and (ii) selecting a representative value from the sampled signals. In this case, the target signal, which will be subjected to the noise reduction, is a signal outputted from the sample delay circuit 71_u (where u is an integer of 1 or greater but not greater than t−1; note, however, that u≠t/2), and the plurality of signals away from the target signal by given intervals are the signal supplied to the sample delay circuit 71_1 and the signal outputted from the sample delay circuit 71_t.

The representative value selection section 82 is thus configured so as to select a median value as a representative value. Embodiment 2, however, is not limited to this. For example, the representative value selection section 82 can be configured so as to find a mean value as a representative value. Note that, in a case where the representative value selection section 82 selects a median value as a representative value, the signal selection section 32 serves as a median filter whose tap number is t (so-called t tap).

The sample delay circuits 71_1 through 71_u in the signal selection section 32 are collectively referred to as a "first tap" in the signal selection section 32, and the number of the sample delay circuits 71_1 through 71_u is referred to as a "first tap number" in the signal selection section 32. Similarly, the sample delay circuits 71_(u+1) through 71_t in the signal selection section 32 are collectively referred to as a "second tap" in the signal selection section 32, and the number of the sample delay circuits 71_(u+1) through 71_t is referred to as a "second tap number" in the signal selection section 32. In this case, the first tap number and the second tap number in the signal selection section 32 are different from each other. As such, the signal selection section 32 is referred to also as an asymmetric filter. Note that it is desirable that each of the first tap number and the second tap number is about 10 at most.

Note that an interval between sampled signals varies depending on the first tap number and the second tap number. As such, intervals, at which the sampling is carried out, vary from noise reduction unit 102 to noise reduction unit 102.

The noise reduction units 102_r have respective different combinations of first and second tap numbers. This causes a combination of intervals between a target signal and a plurality of sampled signal excluding the target signal to vary from noise reduction unit 102 to noise reduction unit 102.

It is preferable that a "small tap number" is at least half as large as a "large tap number" in each of the signal selection sections 32, where the "large tap number" is a larger one of the first and second tap numbers and the "small tap number" is a smaller one of the first and second tap numbers.

Furthermore, it is preferable that the large tap number in increased as a noise reduction unit 102 is located on a more upstream side. This is described with an example as follows. In a case where the noise reduction unit 102_1 on a most upstream side includes a first tap number of "7" and a second tap number of "5" (that is, in a case where the large tap number is "7"), it is preferable that the noise reduction unit 102_2, which immediately follows the noise reduction unit 102_1, includes a first tap number of "4" and a second tap number of "6" (that is, the large tap number is "6"), for example. Furthermore, it is preferable that a noise reduction unit 102_23, which immediately follows the noise reduction unit 102_2, includes a first tap number of "5" and a second tap numbers of "3" (that is, the large tap number is "5"), for example.

It is preferable that a difference between a total of entire first tap numbers and a total of entire second tap numbers is made as small as possible. This is because a noise signal is a stationary signal independent from an image signal. That is, it is preferable that a configuration of the signal processing device 201b, as a whole, is as symmetric as possible. It is further preferable that the noise reduction units 102 are configured so that (i) a noise reduction unit 102 in which the first tap number is a larger one of the first and second tap numbers and (ii) a noise reduction unit 102 in which the second tap number is a larger one are alternated. For example, it is preferable that, in a case where the noise reduction unit 102_1 which is located on a most upstream side of the cascade-connected noise reduction units 102 includes a first tap number of "6" and a second tap number of "4" (as early described), the noise reduction unit 102_2, which immediately follows the noise reduction unit 102_1, includes a first tap number of "3" and a second tap number of "5", and the noise reduction unit 102_23, which immediately follows the noise reduction unit 102_2, includes a first tap number of "4" and a second tap number of "2" (see FIG. 15 later described).

That is, the following configuration is a most preferable configuration of the signal processing device 201b: (1) a large tap number is increased as a noise reduction unit 102 is located on a more upstream side of the cascade-connected noise reduction units 102 and (2) (i) a noise reduction unit 102 in which the first tap number is a larger one of the first and second tap numbers and (ii) a noise reduction unit 102 in which the second tap number is a larger one are alternated sequentially from the upstream side of the cascade-connected noise reduction units 102. Further, it is preferable that, in the signal processing device 201b as a whole, the total of the entire first tap numbers and the total of the entire second tap numbers are identical to each other (as close to symmetric as possible).

(How to Reduce Noise Component in One Noise Reduction Unit)

With reference to FIGS. 13 and 14, the following description will discuss how one (1) noise reduction unit 102 reduces noise components.

FIG. 13 is a block diagram illustrating a main configuration of the noise reduction unit 102 described below. (a) of FIG. 13 is a block diagram illustrating a main configuration of a noise reduction unit 102 including a signal selection section 32 in which six sample delay circuits 71 (sample delay circuits 71_1 through 71_6) are provided so that a first tap number is "4" and a second tap number is "2". As such, the noise reduction unit 102 carries out sampling with intervals of "+2" and "−4" from a signal outputted from a sample delay circuit 71_4.

(b) of FIG. 13 is a block diagram illustrating a main configuration of a noise reduction unit 102 including a signal selection section 32 in which eight sample delay circuits 71 (sample delay circuits 71_1 through 71_8) are provided so that a first tap number is "3" and a second tap number is "5". As such, the noise reduction unit 102 carries out sampling with intervals of "+5" and "−3" from a signal outputted from a sample delay circuit 71_3.

(c) of FIG. 13 is a block diagram illustrating a main configuration of a noise reduction unit 102 including a signal selection section 32 in which ten sample delay circuits 71 (sample delay circuits 71_1 through 71_10) are provided so that a first tap number is "6" and a second tap number is "4". As such, the noise reduction unit 102 carries out sampling with intervals of "+4" and "−6" from a signal outputted from a sample delay circuit 71_6.

It is assumed that an input signals SiB, having a waveform as illustrated in (a) of FIG. 14, is supplied to each of the respective noise reduction units 101 (see (a) through (c) of FIG. 13). (a) of FIG. 14 is a view schematically illustrating an example waveform of the input signal SiB in which noise components are mixed to an image signal, an example waveform of the image signal in the input signal SiB, and an example waveform of the noise components mixed to the image signal in the input signal SiB.

(b) of FIG. 14 is a view schematically illustrating an example waveform of an output signal SoB obtained by supplying the input signal SiB (see (a) of FIG. 14) to the noise reduction unit 102 (see (a) of FIG. 13), an example waveform of an image signal in the output signal SoB, and an example waveform of noise components mixed to the image signal in the output signal SoB.

(c) of FIG. 14 is a view schematically illustrating an example waveform of an output signal SoB obtained by supplying the input signal SiB (see (a) of FIG. 14) to the noise reduction unit 102 (see (b) of FIG. 13), an example waveform of an image signal in the output signal SoB, and an example waveform of noise components mixed to the image signal in the output signal SoB.

(d) of FIG. 14 is a view schematically illustrating an example waveform of an output signal SoB obtained by supplying the input signal SiB (see (a) of FIG. 14) to the noise reduction unit 102 (see (c) of FIG. 13), an example waveform of an image signal in the output signal SoB, and an example waveform of noise components mixed to the image signal in the output signal SoB.

Since a first tap number and a second tap number are different from each other in each of the noise reduction units 102 (see (a) through (c) of FIG. 13), the each of the noise reduction units 102 (see (a) through (c) of FIG. 13) carries out noise reductions with respect to two different frequency ranges of the input signal SiB (see (b) through (d) of FIG. 14).

Furthermore, since the noise reduction units 102 (see (a) through (c) of FIG. 13) have respective different combinations of first and second tap numbers, the noise reduction units 102 (see (a) through (c) of FIG. 13) carry out noise reductions with respect to respective different combinations of frequency ranges of the input signal SiB.

As such, by using two or more different noise reduction units 102 which are cascade-connected to each other, it is possible to greatly reduce noise components, mixed in an input signal SIN, in different frequency ranges.

(Concrete Example Configuration of Signal Processing Device)

The following description will discuss a concrete example configuration of the signal processing device 201b with reference to FIG. 15. FIG. 15 is a block diagram illustrating a concrete example configuration of the signal processing device 201b. A signal processing device 201b illustrated in FIG. 15 is an example configuration including three noise reduction units 102. According to the signal processing device 201b, (i) the noise reduction unit 102 illustrated in (c) of FIG. 13 is used as a noise reduction unit 102_1, (ii) the noise reduction unit 102 illustrated in (b) of FIG. 13 is used as a noise reduction unit 102_2, and (iii) the noise reduction unit 102 illustrated in (a) of FIG. 13 is used as a noise reduction unit 102_3. The three noise reduction units 102 are cascade-connected to each other. Note that, for convenience, the following description will discuss a configuration in which three noise reduction units 102 are cascade-connected to each other. However, Embodiment 2 is not limited to this. Two or more noise reduction units 102 can be cascade-connected to each other, provided that the number of cascade-connected noise reduction units 102 is not limited to three as long as it is more than one.

With the configuration, an input signal SIN supplied to the signal processing device 201b is subjected to a noise component reduction in the noise reduction unit 102_1, is further subjected to a noise component reduction in the noise reduction unit 102_2, and is then subjected to a noise reduction unit 102_3.

Note that (i) the number of sample delay circuits 71 (tap number) in a signal selection section 32_1 in the noise reduction unit 102_1, (ii) the number of sample delay circuits 71 (tap number) in a signal selection section 32_2 in the noise reduction unit 102_2, and (iii) the number of sample delay circuits 71 (tap number) in a signal selection section 32_3 in the noise reduction unit 102_3 are different from each other. As such, the noise reduction units 102_1, 102_2, and 102_3 are different from each other in a combination of intervals between a target signal and a plurality of sampled signal excluding the target signal. Specifically, a combination of sample intervals of "+4" and "−6" in the noise reduction unit 102_1, a combination of sample intervals of "+5" and "−3" in the noise reduction unit 102_2, and a combination of sample intervals of "+2" and "−4" in the noise reduction unit 102_1 are different from each other.

This causes the noise reduction unit 102_1 through 102_3 to reduce respective noise components whose frequency ranges are different from each other, as early described.

Like each noise reduction unit 101, each noise reduction unit 102 outputs an output signal SoB which is partially concentrated in a higher frequency range in an input signal SiB. It is preferable to configure the noise reduction units 102 so that (i) a noise reduction unit 102, in which a signal selection section 32 whose tap number is large is included, carries out a process with respect to a low frequency range of the input signal SIN, and then (ii) another noise reduction unit 102, in which a signal selection section 32 whose tap number is small is provided, carries out a process with respect to a higher frequency range of the input signal SIN (see FIG. 15). With the configuration, it is possible that, each time an input signal SiB is passed through a noise reduction section 102, noise components mixed in the input signal SiB are gradually concentrated in a higher frequency range. This causes noise components, mixed in an output signal SoB outputted from a noise reduction unit 102 on a most downstream side of the cascade-connected noise reduction units 102, to be concentrated in a high frequency range of the output signal SoB. It follows that noise components in a low frequency range of the output signal SoB have been reduced. Note that, because how the noise components are gradually concentrated in a higher frequency range is similar to the ways described in Embodiment 1, explanation of such gradual concentration of the noise components in the higher frequency range is omitted here.

The noise components are thus gradually concentrated in the higher frequency range in each of two or more noise reduction units 102. This ultimately causes the noise components to be so small that it is difficult for human visual sense to detect the noise components. That is, it is possible to make it difficult for humans to view the noise components. As such, it is possible to greatly reduce the noise components.

As such, with the signal processing device 201b, it is possible to greatly reduce noise components mixed in the input signal SIN.

(Modification Example of Signal Selection Section)

The representative value selection section 82 in the signal selection section 32 is thus configured so as to select a median voltages of the following three signals as the representative value, namely, (a) the signal inputted to the sample delay circuit 71_1, (b) the signal outputted from the sample delay circuit 71_u (u is an integer of 1 or greater but not greater than t−1; note, however, that u≠t/2), and (c) the signal outputted from the sample delay circuit 71_t. However, the present invention is not limited to this. Alternatively, the representative value section 82 can select a median voltage of four or more signals as a representative value. This makes it possible to detect more subtle changes in signal. As such, even in case of an image requiring a fine change in signal, such as an image of grass or that of fog, it is still possible to detect a small change in signal. This makes it possible to reduce noise components.

FIG. 16 illustrates a modification example. A signal selection section 32 illustrated in FIG. 16 is configured so as to select a median voltage of four signals.

[Main Scanning Direction Process, Sub Scanning Direction Process, and Time Direction Process]

As early described, each sample delay circuits 71 can (i) output a signal delayed, by a unit of time, in a main scanning direction (transverse direction, horizontal direction) of an image indicated by an input signal, (ii) output a signal delayed, by a unit of time, in a sub scanning direction (longitudinal direction, vertical direction) of an image indicated by an input signal, and (iii), in a case where an input signal is an input signal SIN indicating a moving image, output a signal delayed, by a unit of time (within each frame), in a time direction of the moving image indicated by the input signal SIN.

In a case where each sample delay circuit 71 is configured as described in (1), the noise reduction units 101 and 102 reduces noise components in the direction in which the main scanning direction of an image extends. A process, in which the noise components are reduced in the direction in which the main scanning direction of an image extends, is hereinafter referred to as a main scanning direction process.

In a case where each sample delay circuit 71 is configured as described in (2), the noise reduction units 101 and 102 reduce noise components in the direction in which the sub scanning direction of an image extends. A process, in which the noise components are reduced in the direction in which the sub scanning direction of an image extends, is hereinafter referred to as a sub scanning direction process.

In a case where each sample delay circuit 71 is configured as described in (3), the noise reduction units 101 and 102 reduce noise components in the direction in which the time direction of a moving image extends. A process, in which the noise components are reduced in the direction in which the time direction of a moving image extends, is hereinafter referred to as a time direction process.

Note that, it is possible to more greatly reduce noise components mixed in the input signal SIN, by configuring each sample delay circuit 71 so that it carries out, in whole or in part, the main scanning direction process, the sub scanning direction process, and the time direction process, successively.

[Verification by Use of Actual Image]

With reference to FIG. 17, the following description will discuss how the signal processing device 201 carries out a noise reduction process with respect to an actual image in which noise components are mixed. The following description will particularly discuss how the signal processing device 201 carries out the main scanning direction process and the sub scanning direction process with respect to the actual image.

(a) of FIG. 17 is a view illustrating an example image in which discrete noise components are mixed. Such an image is often viewed in analog television broadcasting or the like. An image illustrated in (a) of FIG. 17 is an image to which the noise reduction process is to be carried, and is hereinafter referred to as a target image P.

(b) of FIG. 17 is view illustrating an example image obtained after the main scanning direction process and the sub scanning direction process have been carried out with respect to the target image P in the signal processing device 201. Specifically, (b) of FIG. 17 is a view illustrating an example image obtained after (i) the main scanning direction process has been carried out with respect to the target image P by the noise reduction unit 101_1 including a signal selection section 31_1 in which each of first tap number and second tap number is "1" and then (ii) the sub scanning direction process is further carried out with respect to the target image P by the noise reduction unit 101_2 including the signal selection section 31_2 in which each of first tap number and second tap number is "1."

(c) of FIG. 17 is a view illustrating another example image obtained after the main scanning direction process and the sub scanning direction process are carried out with respect to the target image P in the signal processing device 201. Specifically, (c) of FIG. 17 is a view illustrating an example image obtained after (i) the main scanning direction process is carried out with respect to the target image P in the noise reduction unit 102_1 including a signal selection section 32_1 in which a first tap number is "3" and a second tap number is "1" and (ii) the sub scanning direction process is further carried out with respect to the target image P in the noise reduction unit 102_2 including a signal selection section 32_2 in which a first tap number is "3" and a second tap number is "1".

(d) of FIG. 17 is a view illustrating still another example image obtained after the main scanning direction process and the sub scanning direction process are carried out with respect to the target image P in the signal processing device 201. Specifically, (d) of FIG. 17 is a view illustrating the example image obtained after (i) the main scanning direction process is carried out with respect to the target image P in the noise reduction unit 101_1 including a signal selection section 31_1 in which each of first tap number and second tap number is "3" and (ii) the sub scanning direction process is further carried out with respect to the target image P in the noise reduction unit 101_2 including a signal selection section 31_2 in which each of first tap number and second tap number is "3".

The images illustrated in (b) through (d) of FIG. 17 have been subjected to respective reductions in noise components. The image illustrated in (d) of FIG. 17 has been subjected to the largest reduction in noise components, the image illustrated in (c) has been subjected to the second largest reduction in noise components, and the image illustrated in (b) of FIG. 17 has been subjected to the third largest reduction in noise components.

Modification Example

Embodiment 1 has described the signal processing device 201a in which only the noise reduction units 101 are cascade-connected to each other. Embodiment 2 has described the signal processing device 201b in which only the noise reduction units 102 are cascade-connected to each other. Note, however, that the signal processing device 201 is neither limited to the configuration of the signal processing device 201a nor limited to the configuration of the signal processing device 201b. For example, the signal processing device 201 can be configured so that one or more noise reduction units 101 and one or more noise reduction units 102 are mixed and cascade-connected to each other.

Reference Embodiment

Note that the noise reduction unit 102 described in Embodiment 2 alone can bring about an effect similar to the noise reduction effect brought about by the signal processing device 201a described in Embodiment 1. This is described with an example configuration of the signal processing device 201a illustrated in FIG. 7.

A signal processing device 201a illustrated in FIG. 7 is configured so that a noise reduction unit 101_1 including eight sample delay circuits 71 and a noise reduction unit 101_2 including four sample delay circuits 71 are cascade-connected to each other.

In this case, the signal selection section 31_1 of the noise reduction unit 101_1 carries out sampling with intervals of "±4" from a signal outputted from a sample delay circuit 71_4, and selects a representative value from voltages of respective sampled signals.

A signal selection section 31_2 of the noise reduction unit 101_2 carries out sampling with intervals of "±2" from a signal outputted from a sample delay circuit 71_2, and selects a representative value from voltages of respective sampled signals.

In contrast to this, the noise reduction unit 102 illustrated in (a) of FIG. 13 brings about an effect similar to the effect brought by the signal processing device illustrated in FIG. 7. A signal selection section 32 of the noise reduction unit 102 illustrated in (a) of FIG. 13 carries out sampling with intervals of "+2" and "−4" from a signal outputted from a sample delay circuit 71_4, and selects a representative value from voltages of respective sampled signals.

With the configuration, the signal selection section 31_1 of the noise reduction unit 101_1 (see FIG. 7) and the first tap of the noise selection sections 32 of the noise reduction unit 102 (see (a) of FIG. 13) reduce respective noise components whose frequency ranges are identical to each other. Also, the signal selection section 31_2 of the noise reduction unit 101_2 (see FIG. 7) and the second tap of the noise selection sections 32 of the noise reduction unit 102 (see (a) of FIG. 13) reduce noise components whose frequency ranges are identical to each other.

As such, the noise reduction unit 102 (see (a) of FIG. 13) reduces the noise components whose frequency range is close to the frequency ranges of the noise components reduced in the respective noise reduction units 101_1 and 101_2 (see FIG. 7). On this account, it can be said that the noise reduction unit 102 brings about a noise reduction effect substantially similar to the noise reduction effect brought by the signal processing device 201a.

Finally, the blocks of the signal processing devices 201 may be realized by way of hardware, by using a logic circuit provided on an integrated circuit (IC chip), or software as executed by a CPU (central processing unit) as follows:

In a case where the blocks of the signal processing devices 201 are realized by way of software, the signal processing devices 201 (particularly, noise reduction units 101 and 102) each include a CPU and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the signal processing devices 201a computer-readable storage medium containing control program code (executable program, intermediate code program, or source program) for signal processing devices 201, which is software realizing the aforementioned functions, in order for the computer (or CPU, MPU) to retrieve and execute the program code contained in the storage medium.

The storage medium may be a non-transitory tangible medium, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; a semiconductor memory, such as a mask ROM/EPROM/EEPROM/flash ROM; or a logic circuit, such as a PLD (Programmable Logic Device).

The signal processing device 201 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), IEEE 802.11 wireless, HDR (High Data Rate), NFC (Near Field Communication), DLNA (Digital Living Network Alliance), mobile telephone network, satellite line, or terrestrial digital network. The present invention encompasses a computer data signal which is buried in a carrier wave and in which the program code is embodied electronically.

In the present Specification, the word "means" thus does not necessary means physical means. As such, the present invention encompasses an aspect that a function of each means is realized by way of software. A function of one means can be realized by two or more physical means, or functions of two or more means can be realized by one physical means.

The signal processing device of the present invention is thus a signal processing device that outputs an output signal in which noise components mixed in an input signal have been reduced, including: a plurality of noise reduction units, cascade-connected to each other, the input signal being supplied to a most upstream side of the plurality of noise reduction units, each of the plurality of noise reduction units including: signal selection means for (i) sampling, from a received signal, (a) a target signal to be subjected to a noise reduction and (b) a plurality of signals which are away from the target signal by given intervals and (ii) selecting a representative value from sampled signals; voltage determination means for determining which of a determined representative value and a voltage of the target signal is larger; and signal output means for (i) reducing the voltage of the target signal by a given voltage and outputting, as the output signal, the target signal thus reduced, in a case where the voltage of the target signal is determined to be larger than the representative value, (ii) increasing the voltage of the target signal by a given value and outputting, as the output signal, the target signal thus increased, in a case where the voltage of the target signal is determined to be smaller than the representative value, or (iii) outputting, as the output signal, the target signal as it is, in a case where the voltage of the target signal is equal to the representative value, a combination of intervals between a target signal and a plurality of signal excluding the target signal to vary from noise reduction unit to noise reduction unit, a noise reduction unit, which is located on the more upstream side of the plurality of noise reduction units, having a larger maximum value of the intervals between the target signal and the plurality of signal excluding the target signal.

The integrated circuit of the present invention is thus an integrated circuit that outputs an output signal in which noise components mixed in an input signal have been reduced, including: a plurality of noise reduction units, cascade-connected to each other, the input signal being supplied to a most upstream side of the plurality of noise reduction units each of the plurality of noise reduction units including a signal selection circuit, which (i) samples, from a received signal, (a) a target signal to be subjected to a noise reduction and (b) a plurality of signals which are away from the target signal by given intervals and (ii) selects a representative value from sampled signals; a voltage determination circuit, which determines which of a determined representative value and a voltage of the target signal is larger; and a signal output circuit, which (i) reduces the voltage of the target signal by a given voltage and outputs, as the output signal, the target signal thus reduced, in a case where the voltage of the target signal is determined to be larger than the representative value, (ii) increases the voltage of the target signal by a given value and outputs, as the output signal, the target signal thus increased, in a case where the voltage of the target signal is determined to be smaller than the representative value, or (iii) outputs, as the output signal, the target signal as it is, in a case where the voltage of the target signal is equal to the representative value, a combination of intervals between a target signal and a plurality of signal excluding the target signal to vary from noise reduction unit to noise reduction unit, a noise reduction unit, which is located on the more upstream side of the plurality of noise reduction units, having a larger maximum value of the intervals between the target signal and the plurality of signal excluding the target signal.

With the configuration, each time an input signal is passed through a cascade-connected noise reduction unit, noise components mixed in the input signal are gradually reduced in a lower frequency range and gradually increased in a higher frequency range. This causes noise components, mixed in an output signal outputted from a most downstream side of the plurality of noise units, to be concentrated in a high frequency range of the output signal.

The present invention thus including the plurality of noise reduction units brings about an effect to cause noise components mixed in an image to appear as if they were reduced, as compared with a conventional art.

Further, the signal processing device of the present invention can be configured so that the intervals between the target signal and the plurality of signal excluding the target signal are equal to each other in each of the plurality of noise reduction units.

Further, the signal processing device of the present invention can be configured so that the intervals between the target signal and the plurality of signal excluding the target signal are different from each other in each of the plurality of noise reduction units.

According to the configuration, the intervals between the target signal and the plurality of signal excluding the target signal are different from each other. This makes it possible for each of the plurality of noise reduction units to reduce respective noise components whose frequency ranges are different from each other.

The signal processing device of the present invention can be configured so that the signal selection means selects, as the representative value, a median voltage of the sampled signals.

According to the configuration, the signal selection means selects, as the representative value, a median voltage of the sampled signals. As such, a median filter known to a public can be used to serve as the signal selecting means.

Further, the signal processing device of the present invention can be configured so that the signal selection means carries out sampling from a signal indicating a pixel group made up of pixels adjacently arranged in a direction in which a main scanning direction of an image indicated by the received signal extends.

According to the configuration, furthermore, sampling is carried out in the main scanning direction of the image. This makes it possible to reduce noise components in the direction in which the main scanning direction of the image extends.

Further, the signal processing device of the present invention can be configured so that the signal selection means carries out sampling from a signal indicating a pixel group made up of pixels adjacently arranged in a direction in which a sub scanning direction of an image indicated by the received signal extends.

According to the configuration, furthermore, sampling is carried out in the direction in which the sub scanning direction of the image extends. This makes it possible to reduce noise components in the direction in which the sub scanning direction of the image extends.

Further, the signal processing device of the present invention can be configured so that: the input signal indicates a moving image; and the signal selection means carries out sampling from a signal indicating a pixel group made up of pixels adjacently arranged in a direction in which a time direction of a moving image indicated by the received signal extends.

According to the configuration, furthermore, the sampling is carried out in the time direction of the image. This makes it possible to reduce noise components in the direction in which the time direction of the image extends.

The signal processing device may be realized on a computer. In this case, the scope of the present invention encompasses a control program for realizing the signal processing device on the computer by causing the computer to operate as each means. The scope of the present invention also encompasses a computer-readable storage medium in which the control program is stored.

Further, the scope of the invention also encompasses a chip including the integrated circuit, an ROM (read only memory) in which the control program is stored, and the like.

The present invention is not limited to the description of the embodiments above, but may be altered by a skilled person within the scope of the claims. An embodiment derived from a proper combination of technical means disclosed in different embodiments is also encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided that such variations do not exceed the scope of the patent claims set forth below.

INDUSTRIAL APPLICABILITY

The present invention can be applied to a device for processing a signal such as an image signal and an audio signal. Particularly, the present invention can be suitably applied to a display device for displaying an image such as a still image and a moving image.

REFERENCE SIGNS LIST

31, 32: signal selection section (signal selecting means, signal selecting circuit)

51: voltage determination section (voltage determining means, voltage determining circuit)

61: signal outputting section (signal outputting means, signal outputting circuit)

101, 102: noise reduction unit

201, 201a, 201b: signal processing device (integrated circuit)

The invention claimed is:

1. A signal processing device that outputs an output signal in which noise components mixed in an input signal have been reduced, comprising:

a plurality of noise reduction units, cascade-connected to each other, the input signal being supplied to a most upstream side of the plurality of noise reduction units, each of the plurality of noise reduction units including:

a signal selection device arranged to (i) sample, from a received signal, (a) a target signal to be subjected to a noise reduction and (b) a plurality of signals which are away from the target signal by given intervals and (ii) select a representative value from sampled signals;

a voltage determination device arranged to determine which of a determined representative value and a voltage of the target signal is larger; and a signal output device arranged to (i) reduce the voltage of the target signal by a given voltage and outputting, as the output signal, the target signal thus reduced, in a case where the voltage of the target signal is determined to be larger than the representative value, (ii) increase the voltage of the target signal by a given value and outputting, as the output signal, the target signal thus increased, in a case where the voltage of the target signal is determined to be smaller than the representative value, or (iii) output, as the output signal, the target signal as it is, in a case where the voltage of the target signal is equal to the representative value, a combination of intervals between a target signal and a plurality of signal excluding the target signal to vary from noise reduction unit to noise reduction unit, a first noise reduction unit, which is located on a more upstream side of the plurality of noise reduction units, carries out processing in a lower frequency range and a second noise reduction unit, which is located on a more downstream side of the plurality of noise reduction units, carries out processing in a high frequency range; and each time the input signal is passed through one of the plurality of noise reduction units, which are cascade-connected to each other, noise components mixed in the input signal are gradually reduced in a lower frequency range and gradually increased in a higher frequency range, causing noise components mixed in a signal outputted from the most downstream side of the plurality of noise reduction units to be concentrated in a higher frequency range.

2. The signal processing device as set forth in claim 1, wherein the intervals between the target signal and the plurality of signal excluding the target signal are equal to each other in each of the plurality of noise reduction units.

3. The signal processing device as set forth in claim 1, wherein the intervals between the target signal and the plurality of signal excluding the target signal are different from each other in each of the plurality of noise reduction units.

4. The signal processing device as set forth in claim 1, wherein the signal selection device selects, as the representative value, a median voltage of the sampled signals.

5. The signal processing device as set forth in claim 1, wherein the signal selection device carries out sampling from a signal indicating a pixel group made up of pixels adjacently arranged in a direction in which a main scanning direction of an image indicated by the received signal extends.

6. The signal processing device as set forth in claim 1, wherein the signal selection device carries out sampling from a signal indicating a pixel group made up of pixels adjacently arranged in a direction in which a sub scanning direction of an image indicated by the received signal extends.

7. The signal processing device as set forth in claim 1, wherein:
- the input signal indicates a moving image; and
- the signal selection device carries out sampling from a signal indicating a pixel group made up of pixels adjacently arranged in a direction in which a time direction of a moving image indicated by the received signal extends.

8. An integrated circuit that outputs an output signal in which noise components mixed in an input signal have been reduced, comprising:
- a plurality of noise reduction units, cascade-connected to each other, the input signal being supplied to a most upstream side of the plurality of noise reduction units,
- each of the plurality of noise reduction units including:
  - a signal selection circuit, which (i) samples, from a received signal, (a) a target signal to be subjected to a noise reduction and (b) a plurality of signals which are away from the target signal by given intervals and (ii) selects a representative value from sampled signals;
  - a voltage determination circuit, which determines which of a determined representative value and a voltage of the target signal is larger; and
  - a signal output circuit, which (i) reduces the voltage of the target signal by a given voltage and outputs, as the output signal, the target signal thus reduced, in a case where the voltage of the target signal is determined to be larger than the representative value, (ii) increases the voltage of the target signal by a given value and outputs, as the output signal, the target signal thus increased, in a case where the voltage of the target signal is determined to be smaller than the representative value, or (iii) outputs, as the output signal, the target signal as it is, in a case where the voltage of the target signal is equal to the representative value,
- a combination of intervals between a target signal and a plurality of signal excluding the target signal to vary from noise reduction unit to noise reduction unit,
- a first noise reduction unit, which is located on a more upstream side of the plurality of noise reduction units, carries out processing in a lower frequency range and a second noise reduction unit, which is located on a more downstream side of the plurality of noise reduction units, carries out processing in a high frequency range; and
- each time the input signal is passed through one of the plurality of noise reduction units, which are cascade-connected to each other, noise components mixed in the input signal are gradually reduced in a lower frequency range and gradually increased in a higher frequency range, causing noise components mixed in a signal outputted from the most downstream side of the plurality of noise reduction units to be concentrated in a higher frequency range.

9. A control program stored on a non-transitory computer readable medium, the control program causing a computer included in a signal processing device recited in claim 1 to operate, said control program causing the computer to function as each of the signal selection device, the voltage determination device, and the signal output device of the signal processing device.

* * * * *